(12) United States Patent
Yoshida et al.

(10) Patent No.: US 10,606,514 B2
(45) Date of Patent: Mar. 31, 2020

(54) STORAGE DEVICE, STORAGE CONTROL DEVICE, AND STORAGE CONTROL PROGRAM

(71) Applicant: FUJITSU LIMITED, Kawasaki-shi, Kanagawa (JP)

(72) Inventors: Masahiro Yoshida, Kawasaki (JP); Tomohiko Muroyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 27 days.

(21) Appl. No.: 15/976,909

(22) Filed: May 11, 2018

(65) Prior Publication Data

US 2018/0335981 A1 Nov. 22, 2018

(30) Foreign Application Priority Data

May 17, 2017 (JP) .................. 2017-098524

(51) Int. Cl.
*G06F 8/65* (2018.01)
*G06F 12/08* (2016.01)
*G06F 13/00* (2006.01)
*G06F 3/06* (2006.01)
*G06F 8/656* (2018.01)

(52) U.S. Cl.
CPC .......... *G06F 3/0659* (2013.01); *G06F 3/0607* (2013.01); *G06F 3/0617* (2013.01); *G06F 3/0632* (2013.01); *G06F 3/0683* (2013.01); *G06F 8/65* (2013.01); *G06F 8/656* (2018.02)

(58) Field of Classification Search
CPC ............. G06F 11/2097; G06F 11/2007; G06F 11/2028; G06F 11/1443; G06F 11/201; G06F 3/0659

USPC ......................................................... 711/154
See application file for complete search history.

(56) References Cited

U.S. PATENT DOCUMENTS

2008/0040818 A1  2/2008  Iima et al.
2008/0052506 A1*  2/2008  Iima ................. G06F 11/1417
                                                                713/1
2008/0133687 A1*  6/2008  Fok ................... G06F 9/5027
                                                                709/207

(Continued)

FOREIGN PATENT DOCUMENTS

JP       09-258907       10/1997
JP       11-102261       4/1999
JP       2008-046791     2/2008

*Primary Examiner* — Mohamed M Gebril
(74) *Attorney, Agent, or Firm* — Fujitsu Patent Center

(57) ABSTRACT

In a control program for one storage control device in a storage device that includes a plurality of storage control devices that control storages and in which configuration information related to configurations of the storages is synchronized among the storage control devices, a process includes; storing, when having received a command to change the configuration information while another storage control device is executing update processing of updating a firmware, specification information specifying a plurality of divided pieces of command processing obtained by dividing processing of the command into executable units in a storage region; and executing each of the divided pieces of the command processing specified by the specification information while the other storage control device is executing any divided piece of the update processing, executable in parallel with the processing of the command.

9 Claims, 15 Drawing Sheets

(56) References Cited

U.S. PATENT DOCUMENTS

2012/0233386 A1* 9/2012 Tong .................... G06F 3/0607
                                                    711/103
2017/0249155 A1* 8/2017 Sundrani .................. G06F 1/30
2017/0272897 A1* 9/2017 Dikeman ................ H04L 45/24
2018/0335981 A1* 11/2018 Yoshida ................. G06F 8/656

* cited by examiner

FIG. 13

| No | SYNCHRONIZATION | DIVISION | NUMBER OF DIVIDED PIECES | NUMBER OF PROCESSED PIECES |
|---|---|---|---|---|
| 1 | Off | Off | | |
| 2 | Off | On | 5 | 2 |
| 3 | On | — | | |
| 4 | Off | Off | | |
| .. | .. | .. | .. | .. |

QUEUE MANAGEMENT TABLE ~412

1301-1, 1301-2, 1301-3, 1301-4

STORAGE DEVICE, STORAGE CONTROL DEVICE, AND STORAGE CONTROL PROGRAM

CROSS-REFERENCE TO RELATED APPLICATION

This application is based upon and claims the benefit of priority of the prior Japanese Patent Application No. 2017-98524, filed on May 17, 2017, the entire contents of which are incorporated herein by reference.

FIELD

The embodiment discussed herein is related to a storage device, a storage control device, and a storage control program.

BACKGROUND

Conventionally, a plurality of storage control devices that control storages have been provided in a storage device to achieve redundancy in some cases. Each storage control device stores configuration information related to the configurations of the storages so that the contents of the configuration information are identical among the storage control devices.

In a related conventional technology (Japanese Laid-open Patent Publication No. 2008-046791), for example, when a new firmware is received from a host and stored in a buffer, the end of update is notified to the host and then the new firmware is written to non-transitory memory and disk in an available time during processing of a command issued by the host. In another technology (Japanese Laid-open Patent Publication No. 11-102261), a first command or a second command is divided into first or second sub commands, respectively, based on a processing time taken for processing of the command on data in the storages and a predetermined unit time, and the first or second sub commands are processed based on a predetermined condition. In another technology (Japanese Laid-open Patent Publication No. 09-258907), commands in such a number that the sum of prediction values of processing time of the commands in a prediction value table is equal to predetermined time are read from a reception queue, a disk having the longest sum of prediction values of processing time of the commands in the reception queue is selected, and the commands for the disk are extracted and issued.

However, in the conventional technologies, update of a firmware is delayed in some cases when processing of a command to change configuration information related to a storage configuration is executed while the firmware is updated at any of a plurality of storage control devices included in a storage device. When the firmware update is executed in priority, the processing of the command to change the configuration information related to the storage configuration is stopped.

One aspect of the embodiment is intended to provide a storage device, a storage control device, and a storage control program that may execute, when a firmware is updated at any of a plurality of storage control devices included in a storage device, the firmware update with reduced delay while not stopping processing of a command to change configuration information related to a storage configuration.

SUMMARY

According to an aspect of the invention, in a control program for one storage control device in a storage device that includes a plurality of storage control devices that control storages and in which configuration information related to configurations of the storages is synchronized among the storage control devices, a process includes; storing, when having received a command to change the configuration information while another storage control device is executing update processing of updating a firmware, specification information specifying a plurality of divided pieces of command processing obtained by dividing processing of the command into executable units in a storage region; and executing each of the divided pieces of the command processing specified by the specification information while the other storage control device is executing any divided piece of the update processing, executable in parallel with the processing of the command.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is an explanatory diagram illustrating exemplary storage contents of a queue management table;

DESCRIPTION OF EMBODIMENT

Embodiments of a storage device, a storage control device, and a storage control program according to the present disclosure will be described in detail below with reference to the accompanying drawings.

Figure 1:
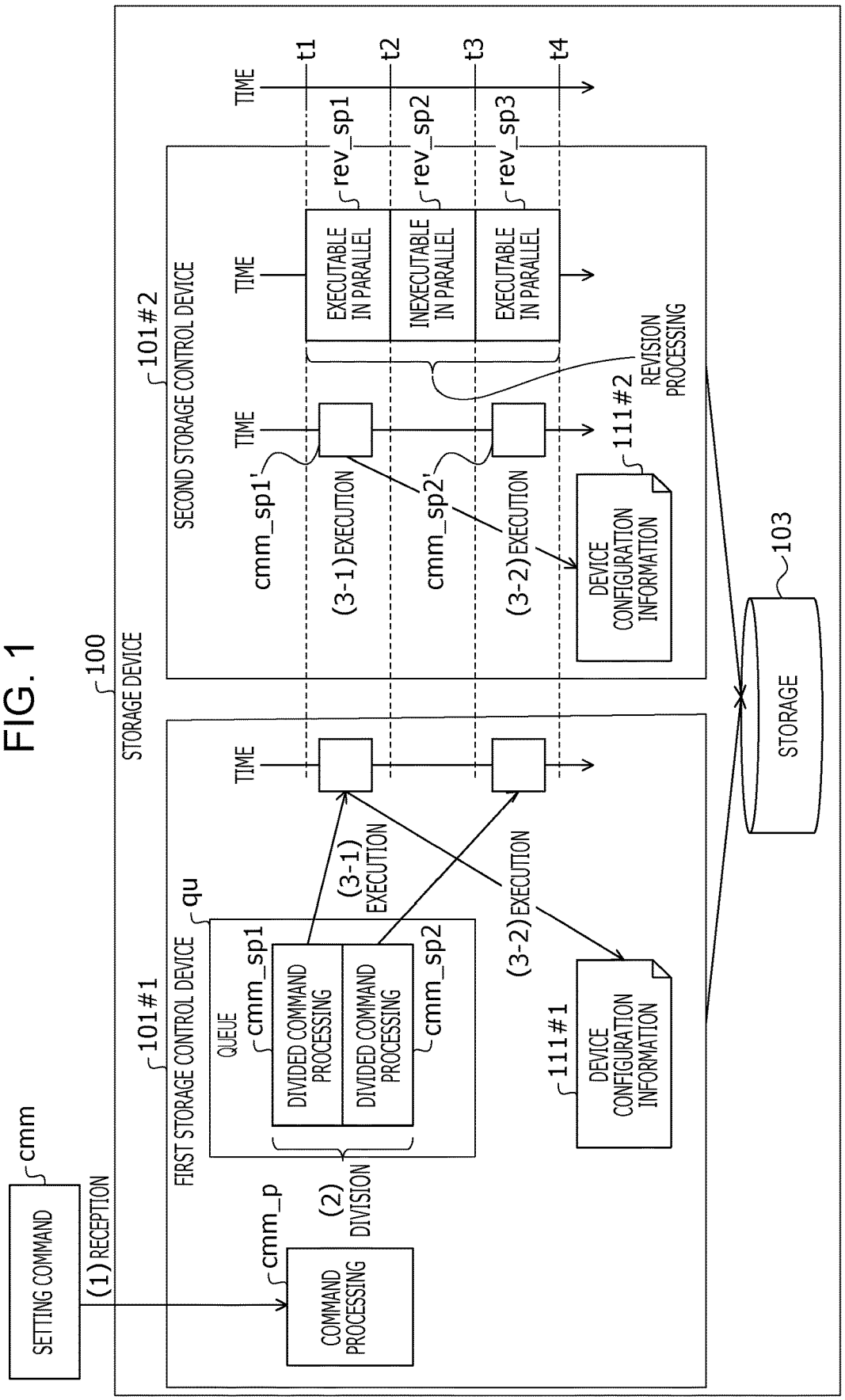
FIG. 1 is an explanatory diagram illustrating an exemplary operation of a storage device according to the present embodiment.

FIG. 1 is an explanatory diagram illustrating an exemplary operation of a storage device 100 according to the present embodiment. The storage device 100 includes a plurality of storage control devices that control storages. More specifically, the storage device 100 is connected with a computer (not illustrated) such as a server that uses the storage device 100 so that, upon reception of a command from the computer, any of the storage control devices executes processing of the received command.

For example, the storage device 100 is a device that provides a plurality of storages as a volume formed based on a redundant arrays of inexpensive disks (RAID) technology. The storage device 100 may be a DB server that controls databases (DBs) as storages, a hierarchized storage device including layers of a plurality of kinds of storages, or a tape library that controls tape drives as storages.

Recently, use of various kinds of unstructured data has been rapidly increased due to wide spread of broadband technologies and advance of information and communication technologies (ICT). In addition, diversification has occurred to a server that accesses a storage control device storing various kinds of unstructured data, and a software that controls the access from the server and system operation. In some technologies, the storage device 100 is set and managed by a system operation software to enhance the diversification and mutual operability in a heterogeneous system of storages. Firmware update of the storage control device, which does not disturb operation is desired in execution and control of various kinds of processing from the system operation software.

A firmware is a control program incorporated in an electronic device to cause the electronic device to perform specific work. A revision number is provided to a computer program in some cases to clearly indicate an order at which the computer program becomes available to a user thereof. Hereinafter, firmware update is referred to as "firmware revision". The software is referred to as "software".

Hereinafter, configuration information on a storage configuration, which is held in the storage device and set and managed by the system operation software, is referred to as "device configuration information". For example, when the storage device 100 employs the RAID technology, the device configuration information includes an identifier of a storage as each of a plurality of volumes, and a RAID level of each volume.

A command to change the device configuration information through the system operation software is referred to as a "device configuration information setting command", and a command to refer to the device configuration information is referred to as a "device configuration information reference command". Change of the device configuration information includes registration of new information to the device configuration information, deletion of information, and update of information. Examples of the device configuration information setting command include commands to create and delete a volume.

To simplify description, device configuration information setting and reference commands are also collectively referred to as "commands". A device configuration information setting command is also referred to as a "setting command", and a device configuration information reference command is also referred to as a "reference command".

Each storage control devices included in the storage device 100 stores the device configuration information so that the contents of the device configuration information are identical among the storage control devices to respond to access from a server without inconsistency. Hereinafter, to have the contents of the device configuration information identical among the storage control devices is simply referred to as to "synchronize the device configuration information".

To synchronize the device configuration information, for example, access from the system operation software is excluded while the firmware revision is performed at any of the storage control devices. This method is intended to exclude inconsistency of memory arrangement and the device configuration information due to execution of firmware revision processing and processing of a command from the system operation software. In the method, however, system operation control and update by the system operation software are delayed during the firmware revision.

Thus, a command from the system operation software has to be executed to avoid interference of operation of the system operation software during the firmware revision at any storage control device. In a method of executing a command from the system operation software during the firmware revision, for example, the firmware is divided into a plurality of pieces, and a command issued by a host or an internally issued command is executed each time update of a divided piece of the firmware to a non-transitory memory ends.

However, in the above-described method, when processing of a command to change the device configuration information is executed at update of the firmware of any storage control device, the firmware revision is delayed by execution of the command.

The present embodiment describes below that, in the firmware revision processing at another storage control device, a storage control device executes pieces of processing obtained by dividing processing of the above-described command during a piece of processing executable in parallel among pieces of processing obtained by dividing the revision processing. The pieces of processing obtained by dividing the revision processing are referred to as "divided pieces of the revision processing".

The following describes an exemplary operation of the storage device 100 with reference to FIG. 1. The storage device 100 illustrated in FIG. 1 includes a plurality of storage control devices of a first storage control device 101#1 and a second storage control device 101#2, and a storage 103. The first storage control device 101#1 and the second storage control device 101#2 control the storage 103.

In the following description, reference signs are used to distinguish components of the same kind, like "storage control device 101#1" and "storage control device 101#2". Only a number common to reference signs is used not to distinguish components of the same kind, like "storage control device 101".

Each storage control device 101 stores device configuration information 111 as configuration information related to the configuration of the storage 103. Each storage control device 101 stores the device configuration information 111 so that the device configuration information 111 has contents identical between the storage control devices 101.

In the state illustrated in FIG. 1, the first storage control device 101#1 governs entire control of the storage device 100, and the second storage control device 101#2 executes revision processing in which firmware is revised. In this state, the first storage control device 101#1 receives a setting command cmm from system operation software. As illustrated at (1) in FIG. 1, the first storage control device 101#1 receives the setting command cmm from the system operation software. The system operation software is executed by a computer different from the storage device 100. Alternatively, the storage device 100 may include a computer that executes the system operation software.

Subsequently, the first storage control device 101#1 stores, in a storage region, specification information that specifies a plurality of divided pieces of command processing obtained by dividing, into executable units, processing of the setting command cmm. Hereinafter, processing of a command is referred to as "command processing". The specification information is data such as the name of a function of a divided piece of command processing and an argument of the function. As illustrated at (2) in FIG. 1, the first storage control device 101#1 stores, in a queue qu, the specification information that specifies a plurality of divided pieces cmm_sp1 and cmm_sp2 of command processing obtained by dividing, into executable units, command processing cmm_p of the command cmm. The queue qu is a storage region in the first storage control device 101#1.

As a result of the division, the divided pieces of the command processing may include a divided piece of the command processing in which the device configuration information 111 is not changed. In the example illustrated in FIG. 1, the divided piece cmm_sp1 of the command processing is processing in which the device configuration information 111 is changed, and the divided piece cmm_sp2 of the command processing is processing in which the device configuration information 111 is not changed.

The following describes exemplary divided pieces of command processing. For example, the first storage control device 101#1 receives a setting command that instructs production of a volume. In this case, command processing of the received command includes processing of updating the device configuration information 111, processing of formatting a storage region to be allocated as a new volume in the storage 103, and processing of mapping the formatted storage region. Thus, in this case, the command processing of the received command can be divided into the three pieces of the command processing.

Then, the first storage control device 101#1 executes each of a plurality of divided pieces of the command processing while the second storage control device 101#2 is executing any divided piece of the revision processing, which is executable in parallel with the setting command processing, among a plurality of divided pieces of the revision processing. The plurality of divided pieces of the command processing may be specified based on the specification information stored in the queue qu. Specifically, examples of the plurality of divided pieces of the revision processing include processing of writing the firmware to a non-transitory memory, and processing of restarting the storage control device 101 by the firmware written to the non-transitory memory. More specific divided pieces of the revision processing will be described with reference to, for example, FIGS. 4 and 15.

In the example illustrated in FIG. 1, the revision processing is divided into three divided pieces rev_sp1, rev_sp2, and rev_sp3 of the revision processing. The divided pieces rev_sp1 and rev_sp3 of the revision processing are executable in parallel with setting command processing, and the divided piece rev_sp2 of the revision processing is inexecutable in parallel with setting command processing. In the example illustrated in FIG. 1, the divided piece rev_sp1 of the revision processing is executed between times t1 and t2, the divided piece rev_sp2 of the revision processing is executed between times t2 and t3, and the divided piece rev_sp3 of the revision processing is executed between times t3 and t4.

In this case, as illustrated at (3-1) in FIG. 1, the first storage control device 101#1 executes the divided piece cmm_sp1 of the command processing between times t1 and t2 when the second storage control device 101#2 executes the divided piece rev_sp1 of the revision processing. To synchronize the device configuration information 111, the second storage control device 101#2 also executes a divided piece cmm_sp1' of the command processing, which is same as the divided piece cmm_sp1 of the command processing. Specifically, the first storage control device 101#1 notifies the second storage control device 101#2 to execute the divided piece cmm_sp1' of the command processing.

Then, for example, the divided piece cmm_sp2 of the command processing may not be executed before time t2 is reached after the divided piece cmm_sp1 of the command processing has ended. In this case, as illustrated at (3-2) in FIG. 1, the first storage control device 101#1 executes the divided piece cmm_sp2 of the command processing between times t3 and t4 when the second storage control device 101#2 is executing the divided piece rev_sp3 of the revision processing. The second storage control device 101#2 also executes a divided piece cmm_sp2' of the command processing, which is same as the divided piece cmm_sp2 of the command processing.

In a method of executing a divided piece of the command processing while the second storage control device 101#2 is executing a divided piece of the revision processing executable in parallel with setting command processing, for example, the first storage control device 101#1 stores a predetermined time in accordance with the divided piece of the revision processing in advance. Then, the first storage control device 101#1 executes the divided piece of the command processing when a time taken for the divided piece of the command processing does not exceed the predetermined time, but does not execute the divided piece of the command processing when the time exceeds the predetermined time. In this manner, the first storage control device 101#1 may execute any divided piece of the command processing appropriate for the predetermined time.

When setting command processing is divided, the first storage control device 101#1 performs exclusive control not to receive any command that affects the divided command processing. For example, a command that instructs increase of the size of a volume is received as a setting command. In this case, command processing of the received command involves processing of updating the device configuration information 111, and processing of formatting a storage region for the increase in size in the storage 103 allocated as a volume. The first storage control device 101#1, which is performing the exclusive control, does not receive any command that would affect the command processing between divided pieces of the command processing obtained by dividing the command processing, and thus may correctly process each divided piece of the command processing.

Access to data in the storage 103 during the revision processing at the second storage control device 101#2 may be normally performed when the first storage control device 101#1 executes processing in accordance with the access.

In this manner, the storage device 100 performs processing executable in parallel with setting command processing during a divided piece of the revision processing, and thus may execute the setting command processing without delay of the revision processing. Accordingly, when firmware revision would interfere with an operation by the system operation software in response to an instruction for setting and management of the storage device, the storage device 100 may perform both operations simultaneously in parallel without inconsistency. The following describes, with reference to FIG. 2, an example in which the storage device 100 is applied to a storage system 200.

Figure 2:
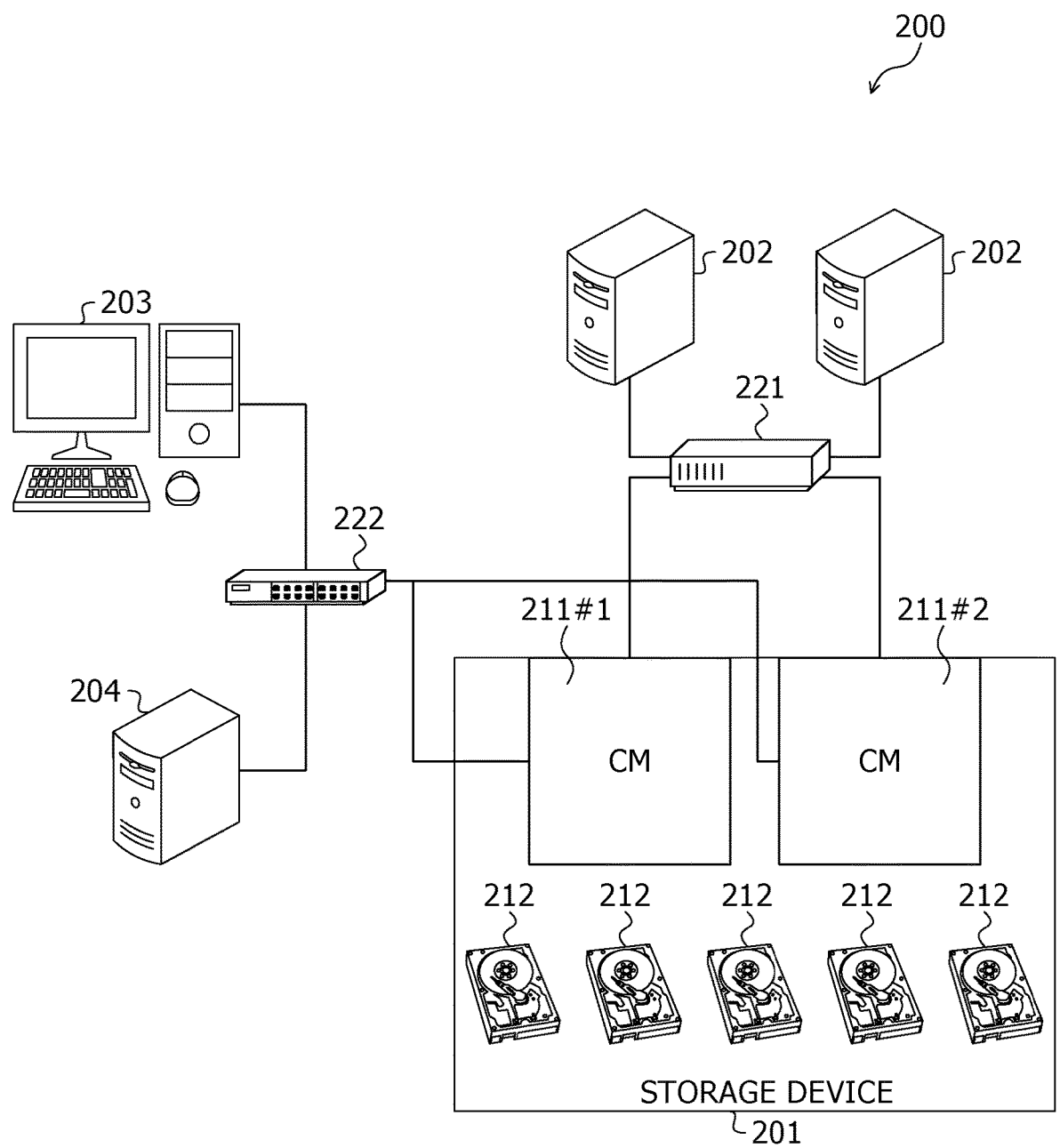
FIG. 2 is an explanatory diagram illustrating an exemplary configuration of a storage system.

FIG. 2 is an explanatory diagram illustrating an exemplary configuration of the storage system 200. The storage system 200 includes a storage device 201, a host I/O server 202, a storage device terminal 203, and a system operation software installation server 204. The storage device 201 includes a plurality of controller modules (CMs) 211 and a plurality of disks 212. The storage device 201 corresponds to the storage device 100 illustrated in FIG. 1. Each CM 211 corresponds to the storage control device 101 illustrated in FIG. 1. Each disk 212 corresponds to the storage 103 illustrated in FIG. 1.

Each CM 211 is connected with each host I/O server 202 through a switch 221. Each CM 211 is connected with the storage device terminal 203 and the system operation software installation server 204 through a switch 222.

The storage device 201 provides storage regions of the disks 212 to the storage device terminal 203. The host I/O server 202 is a server that accesses the storage device 201. The host I/O server 202 is, for example, a Web server or a DB server. The storage device terminal 203 is a computer operated by, for example, an administrator of the storage device 201 and instructs revision of firmware of each CM 211. The system operation software installation server 204 is a computer that executes the system operation software.

Each CM 211 is a controller module (control device) that controls the disks 212. Any one of the CMs 211 serves as a control CM. The control CM performs entire control of the storage device 201. The control CM also performs control of the revision processing and receives a command from the system operation software installation server 204. Hereinafter, a CM that performs the revision processing is also referred to as a "revision target CM".

Each disk 212 is a storage device that stores data of the host I/O servers 202. The disk 212 is, for example, a hard disk drive (HDD) or a solid state drive (SSD).

Figure 3:
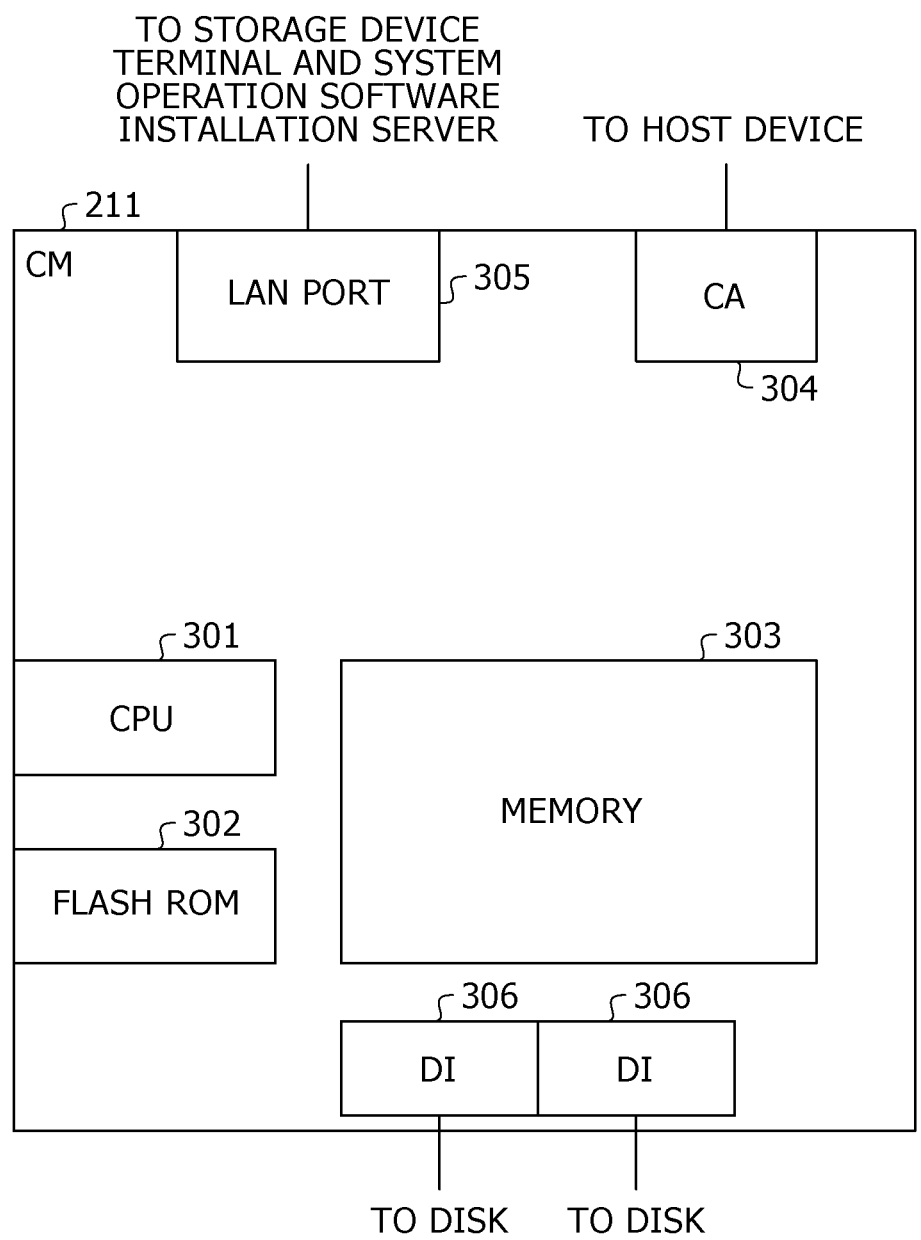
FIG. 3 is an explanatory diagram illustrating an exemplary hardware configuration of a CM.

FIG. 3 is an explanatory diagram illustrating an exemplary hardware configuration of each CM 211. The CM 211 includes a central processing unit (CPU) 301, a flash read only memory (ROM) 302, a memory 303, a channel adaptor (CA) 304, a LAN port 305, and a disk interface (DI) 306.

The CPU 301 is an arithmetic processing device that governs entire control of the CM 211. The CPU 301 may be a multi-core processor including a plurality of processor cores. The flash ROM 302 is a non-transitory memory that stores the firmware of the CM 211 and a storage control program according to the present embodiment. A storage medium of the flash ROM 302 may be, for example, a NAND flash. The memory 303 is a transitory memory that is used as a work area of the CPU 301.

The CA 304 is a communication interface for communication with the host I/O servers 202. The LAN port 305 is a communication interface connected with the storage device terminal 203 and the system operation software installation server 204. The DI 306 is a communication interface for communication with the disks 212.

The host I/O servers 202 and the system operation software installation server 204 each include a CPU, a flash ROM, a cache memory, and a communication interface. The storage device terminal 203 includes a CPU, a flash ROM, a cache memory, a communication interface, a display, a keyboard, and a mouse.

(Exemplary Functional Configuration of CM 211)

Figure 4:
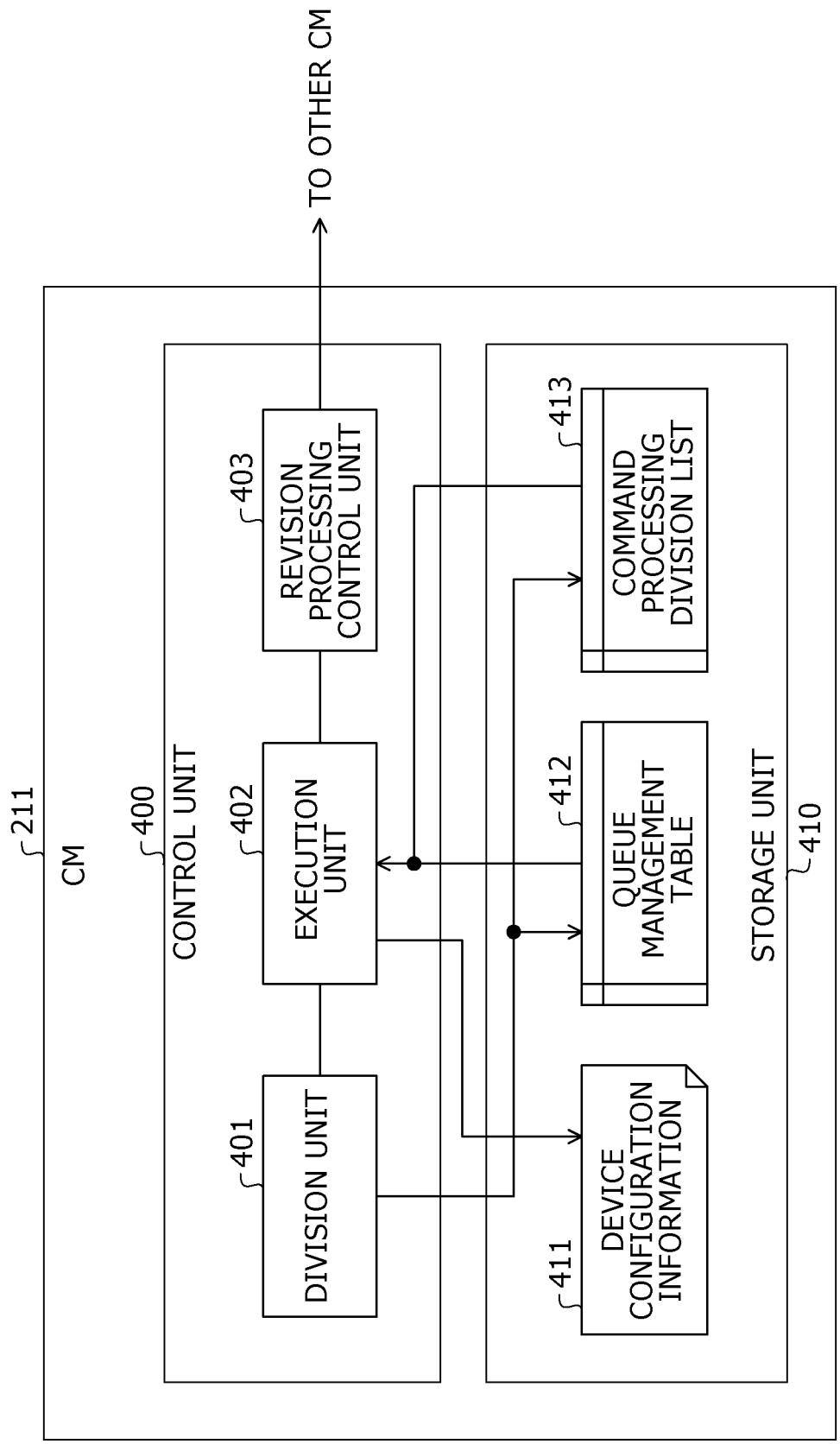
FIG. 4 is an explanatory diagram illustrating an exemplary functional configuration of the CM.

FIG. 4 is an explanatory diagram illustrating an exemplary functional configuration of the CM 211. The CM 211 includes a control unit 400. The control unit 400 includes a division unit 401, an execution unit 402, and a revision processing control unit 403. The control unit 400 achieves the function of each component through the CPU 301 executing a computer program stored in a storage device. Specifically, the storage device is, for example, the flash ROM 302 illustrated in FIG. 3. Any result of processing by each component is stored in, for example, the memory 303, a register of the CPU 301, or a cache memory of the CPU 301. The CM 211 may achieve the division unit 401 and the execution unit 402 through execution of one job, and may achieve the revision processing control unit 403 through execution of another job. The CM 211 may allocate, to processor cores different from each other, the job that achieves the division unit 401 and the execution unit 402 and the job that achieves the revision processing control unit 403.

Figure 14:
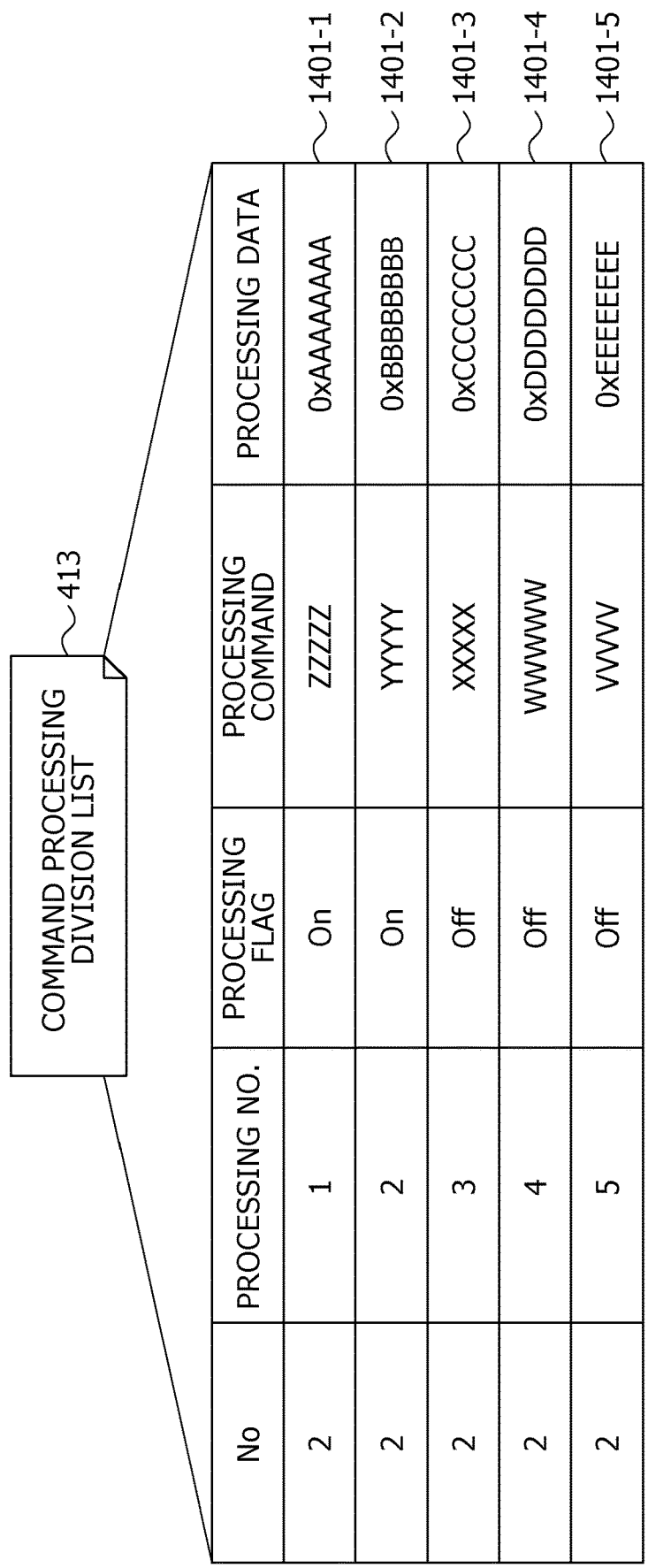
FIG. 14 is an explanatory diagram illustrating exemplary storage contents of a command processing division list.

The CM 211 has access to a storage unit 410. The storage unit 410 is a storage device such as the memory 303. The storage unit 410 stores device configuration information 411, information on a queue management table 412, and information on a command processing division list 413. The device configuration information 411 corresponds to the device configuration information 111 illustrated in FIG. 1. The queue management table 412 is a table in which a received command is managed. FIG. 13 illustrates exemplary storage contents of the queue management table 412. The command processing division list 413 corresponds to the queue qu illustrated in FIG. 1. FIG. 14 illustrates exemplary storage contents of the command processing division list 413.

The following description will be made on functions of the division unit 401 to the revision processing control unit 403 of the CM 211 that is a first CM serving as the control CM among the CMs 211. The control CM may be any of the CMs 211, and thus all CMs 211 may each include the division unit 401 to the revision processing control unit 403.

The division unit 401 divides command processing of a setting command into executable units when the setting command is received while a second CM 211 among the CMs 211 is executing the revision processing. For example, when the received setting command is an asynchronous command, the division unit 401 divides the received command into executable units. An asynchronous command is a command that allows the sender of the command to execute, while ending reception processing of receiving a response to the command, any other processing different from the reception processing. In the present embodiment, the sender of the command is the system operation software installation server 204 or a job executed on the system operation software installation server 204. When having sent an asynchronous command, the system operation software installation server 204 or the job executed on the system operation software installation server 204 may execute processing different from the reception processing. The division unit 401 stores, in the command processing division list 413, specification information that specifies a plurality of divided pieces of the command processing. The division unit 401 also stores, in the queue management table 412, specification information that specifies the command processing before the division.

When having received a synchronous command that changes the device configuration information 411 while the second CM 211 is executing update processing, the division unit 401 stores, in the queue management table 412, specification information that specifies command processing of the received command. A synchronous command is a command not to execute any other processing different from the reception processing described above until the reception processing ends. When having sent a synchronous command, the system operation software installation server 204 or a job executed on the system operation software installation server 204 does not execute any other processing different from the reception processing but waits for a response to the command. In this manner, when having received a synchronous command, the division unit 401 does not divide command processing of the synchronous command.

The execution unit 402 executes each of a plurality of divided pieces of command processing specified by specification information stored in the command processing division list 413 while the second CM 211 is executing any of a plurality of divided pieces of the revision processing, which is executable in parallel with setting command processing. In the present embodiment, the revision processing includes five divided pieces as described below.

The first divided piece of the revision processing is processing of writing the firmware to the flash ROM 302 of the second CM 211. The second divided piece of the revision processing is processing of restarting the second CM through the firmware written to the flash ROM 302. Hereinafter, the restart is referred to as "reboot". The third divided piece of the revision processing is processing of determining whether the second CM 211 is incorporated into the storage device 201. The fourth divided piece of the revision processing is processing of incorporating the second CM 211 into the storage device 201. The fifth divided piece of the revision processing is processing of checking whether the second CM 211 is connected with any other device other than the second CM 211 in the storage device 201 after the second CM 211 is incorporated into the storage device 201. The first to fifth divided pieces of the revision processing are executed sequentially from the first divided piece of the revision processing. In the following description, a stage at which each of the first to fifth divided pieces of the revision processing is executed, in addition to other stages, are also referred to as "phases of the revision processing". The phases of the revision processing are as follows.

First phase: firmware writing phase
Second phase: firmware update starting phase
Third phase: firmware revision CM reboot starting phase
Fourth phase: firmware revision CM reboot-incorporation interruption starting phase
Fifth phase: firmware revision CM reboot-incorporation resume checking phase
Sixth phase: firmware revision CM reboot-incorporation resuming phase
Seventh phase: firmware revision CM reboot post-processing phase The first, third, fifth, sixth, and seventh phases correspond to the first to fifth divided pieces of the revision processing, respectively. The first, second, fourth, fifth, and seventh phases are executable in parallel with setting command processing. Details thereof will be described with reference to FIG. 15.

More specifically, until a predetermined time taken for any of a plurality of divided pieces of the revision processing, which is executable in parallel with setting command processing elapses since the second CM 211 has started executing the divided piece of the revision processing, the execution unit 402 executes each divided piece of the command processing specified by the specification information. The predetermined time is a time taken for each phase of the revision processing, which is stored in the CM 211 in advance. The predetermined time may be set to be a value set by an administrator of the storage device 201 or a value obtained by adding an allowance to a measured value of an execution time taken for each phase in past revision processing.

For example, a plurality of divided pieces of command processing includes an unexecuted divided piece. In this case, the execution unit 402 executes the unexecuted divided piece of the command processing until a time taken for the next divided piece of the revision processing, which is executable in parallel with setting command processing elapses since the second CM 211 has started executing the next divided piece of the revision processing. For example, there are three divided pieces of command processing, and two of the divided pieces of the command processing are executed in the predetermined time for the first phase of the revision processing. In this case, the execution unit 402 executes the remaining one divided piece of the command processing in the predetermined time for the first phase of the revision processing.

The execution unit 402 executes command processing of a synchronous command specified by the specification information before the second CM 211 executes any of a plurality of divided pieces of the revision processing, which is inexecutable in parallel with setting command processing. Specifically, when the queue management table 412 includes a synchronous command, the execution unit 402 instructs the revision processing control unit 403 not to execute any divided piece of the revision processing, which is inexecutable in parallel with setting command processing. Then, the execution unit 402 instructs the revision processing control unit 403 to cause the second CM 211 to execute any divided piece of the revision processing, which is inexecutable in parallel with setting command processing, after all synchronous commands have been executed in the command processing division list 413.

The revision processing control unit 403 causes the revision target CM to sequentially execute a plurality of divided pieces of the revision processing in accordance with the state of the revision target CM and the execution state of a synchronous command. Specifically, the revision processing control unit 403 instructs the revision target CM to transition to a next phase after one phase of the revision processing has ended. When the next phase is inexecutable in parallel with setting command processing and there is any unexecuted synchronous command, the revision processing control unit 403 causes, in accordance with an instruction from the execution unit 402, the revision target CM to execute the synchronous command and then transition to the next phase.

Figure 5:
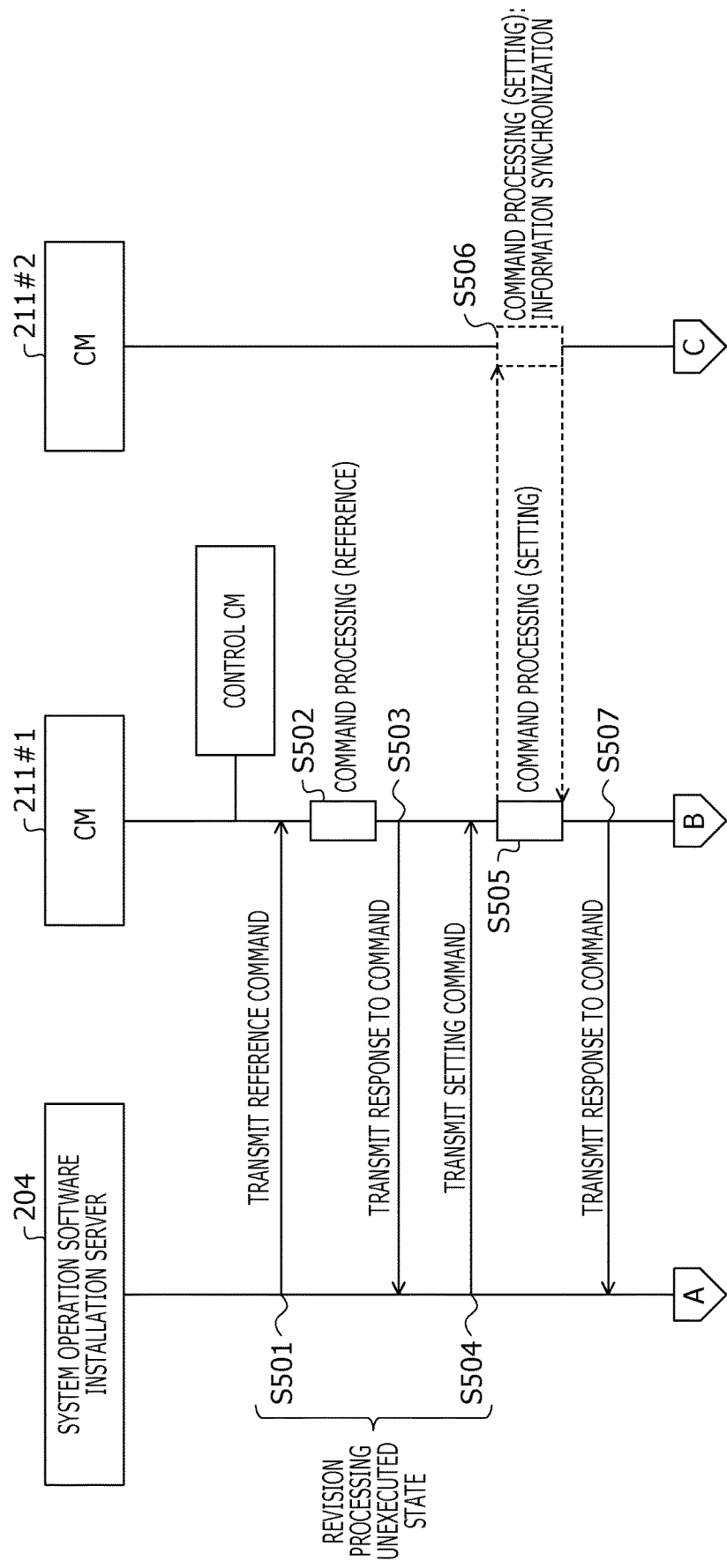
FIG. 5 is an explanatory diagram (1) illustrating a series of sequence in firmware revision.
Figure 6:
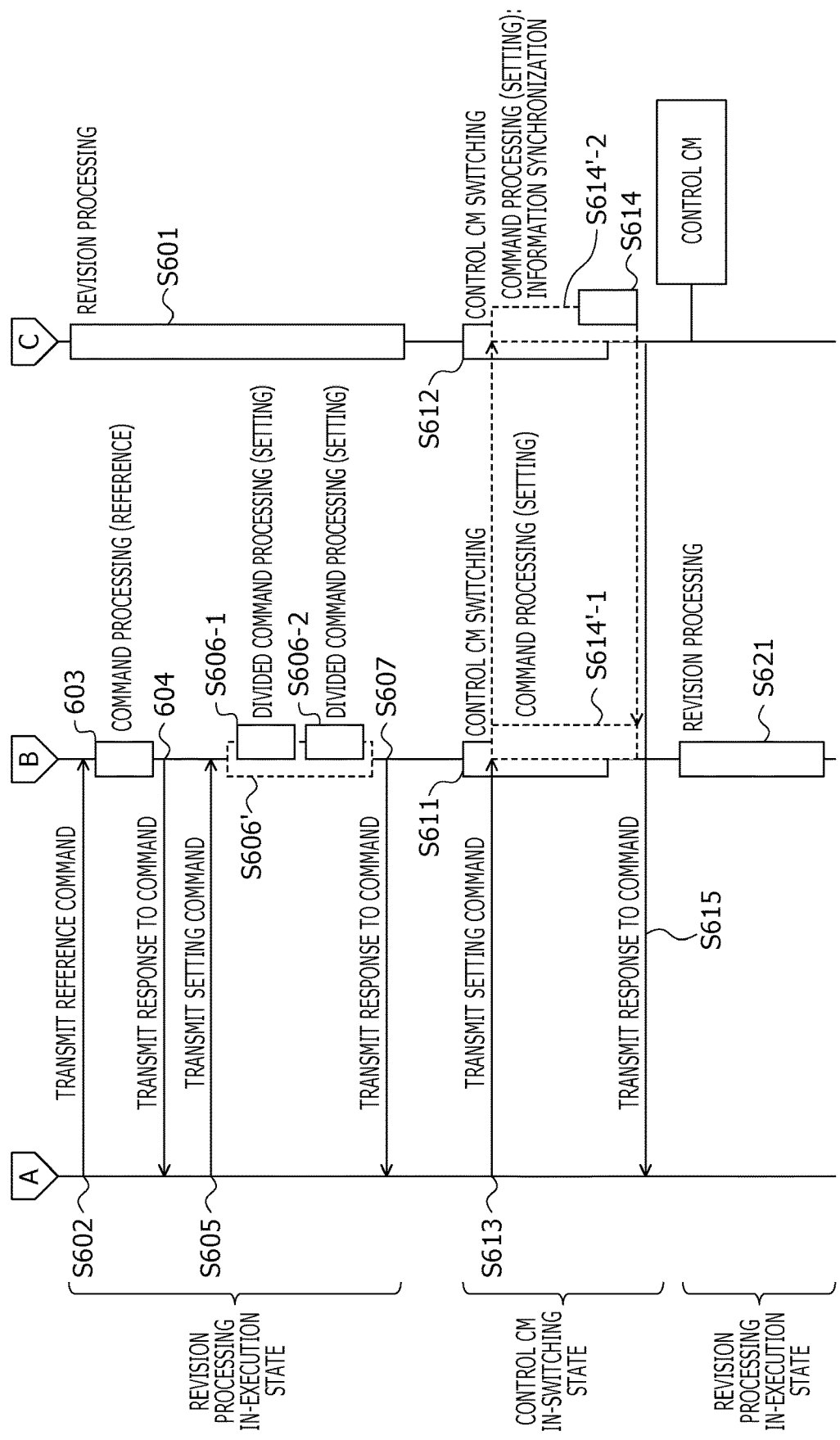
FIG. 6 is an explanatory diagram (2) illustrating a series of sequence in firmware revision.

FIG. 5 is an explanatory diagram (1) illustrating a series of sequence in firmware revision. FIG. 6 is an explanatory diagram (2) illustrating a series of sequence in firmware revision.

In the sequence illustrated in FIGS. 5 and 6, the state of the storage device 201 is roughly classified into a revision processing unexecuted state, a revision processing in-execution state, and a control CM in-switching state. The revision processing unexecuted state is a state in which the revision processing is not executed and the control CM is not switched. The revision processing in-execution state is a state in which the revision processing is being executed. The control CM in-switching state is a state in which the control CM is being switched.

Processing in the revision processing unexecuted state is performed at steps S501 to S507, processing in the revision processing in-execution state is performed at steps S601 to S609, and processing in the control CM in-switching state is performed at steps S611 to S617. In an initial state of the sequence illustrated in FIGS. 5 and 6, the control CM is a CM 211#1.

When the storage device 201 is in the revision processing unexecuted state, the system operation software installation server 204 transmits a reference command to the control CM (step S501). The CM 211#1 as the control CM executes reference command processing (step S502). Then, the CM 211#1 transmits a response to the reference command to the system operation software installation server 204 (step S503).

When the storage device 201 is in the revision processing unexecuted state, the system operation software installation server 204 transmits a setting command to the CM 211#1 (step S504). The CM 211#1 executes setting command processing (step S505). In this case of the setting command, the CM 211#1 synchronizes device configuration information 411#2 of a CM 211#2 with device configuration information 411#1 of the CM 211#1, which is updated by the processing at step S505 (step S506). Then, the CM 211#1 transmits a response to the setting command to the system operation software installation server 204 (step S507).

In the synchronization of the device configuration information 411, the CM 211#1 distributes, to the CM 211#2, the device configuration information 411#1 set by the processing at step S505. Then, the CM 211#2 sets the contents of the device configuration information 411#1 to the device configuration information 411#2, and transmits notification indicating update completion to the CM 211#1. When having received the notification, the CM 211#1 transmits the response to the setting command to the system operation software installation server 204. When there are a plurality of CMs 211 other than the control CM, the control CM distributes the updated device configuration information 411 to each CM 211 other than the control CM. Then, when having received the notification indicating update completion from all CMs 211, the control CM transmits the response to the setting command to the system operation software installation server 204.

Subsequently, the CM 211#2 executes the revision processing (step S601). When the revision processing is started by any of the CMs 211, the storage device 201 becomes the revision processing in-execution state.

Then, when the storage device 201 is in the revision processing in-execution state, the system operation software installation server 204 transmits a reference command to the CM 211#1 (step S602). The CM 211#1 executes reference command processing (step S603). Then, the CM 211#1 transmits a response to the reference command to the system operation software installation server 204 (step S604). In this manner, in the revision processing in-execution state, command processing of a reference command may be executed without restriction.

When the storage device 201 is in the revision processing in-execution state, the system operation software installation server 204 transmits a setting command to the CM 211#1 (step S605). Execution of command processing of the setting command would update the device configuration information 411, potentially causing inconsistency with the revision processing. To avoid this, having received the setting command in the revision processing in-execution state, the CM 211#1 registers the command to the queue management table 412 and executes command processing of the command registered to the queue management table 412 when the CM 211#2 is at a stop point in the revision processing. When the received command is divisible, the CM 211#1 executes command processing of divided pieces of the received command.

In the example illustrated in FIG. 6, in which the received command is divisible into two in the processing at step S605, the CM 211#1 executes divided command processing when the CM 211#2 is at a stop point in the revision processing (steps S606-1 and S606-2). Then, the CM 211#1 transmits a response to the setting command to the system operation software installation server 204 (step S607). Step S606' illustrated in FIG. 6 indicates that the command processing of the command received in the processing at step S605 appears as execution of step S606' to the system operation software installation server 204. Although not illustrated in FIG. 6, the device configuration information 411#2 of the CM 211#2 is synchronized with the device configuration information 411#1 of the CM 211#1 updated through the processing at steps S606-1 and S606-2.

Subsequently, the CM 211#2 ends the revision processing, the CMs 211#1 and 211#2 switch the control CM from the CM 211#1 to the CM 211#2 to allow the CM 211#1 to perform the revision processing (steps S611 and S612). Accordingly, the storage device 201 becomes the control CM in-switching state.

When the storage device 201 is in the control CM in-switching state, the system operation software installation server 204 transmits the setting command to the CM 211#1 (step S613). Command processing of the setting command may not be executed in the control CM in-switching state. After the switching of the control CM ends, the CM 211#2 as the new control CM executes the setting command processing (step S614). Then, the CM 211#2 transmits a response to the setting command to the system operation software installation server 204 (step S615). Steps S614'-1 and S614'-2 illustrated in FIG. 6 indicate that the command processing of the command received in the processing at step S613 appears as execution of step S606' to the system operation software installation server 204.

Since such an operation policy that a setting command is to be executed by the control CM is employed in the present embodiment, the processing at step S614 is executed by the CM 211#2 as the control CM. For example, when such an operation policy that a command is to be executed by a CM having received the command is employed, the processing at step S614 may be executed by the CM 211#1 after switching of the control CM ends. Although not illustrated in FIG. 6, when a reference command is received while the storage device 201 is in the control CM in-switching state, the received command may be simply executed by the CM 211#1.

After the processing at step S615, the CM 211#1 executes the revision processing (step S621). When the revision processing is started by any of the CMs 211, the storage device 201 becomes the revision processing in-execution state again. Command processing in the revision processing in-execution state is identical to the processing at steps S602 to S607, and thus description thereof will be omitted.

Although the firmware revision of the two CMs 211 of the CMs 211#1 and 211#2 is described above with reference to FIGS. 5 and 6, firmware revision of three or more CMs 211 may be performed when the storage device 201 includes three or more CMs 211. For example, the storage device 201 includes four CMs 211#1 to 211#4, and the control CM is the CM 211#1. In this case, the storage device 201 may employ any of two methods described below.

The first method is a method of sequentially performing revision processing. Specifically, the CM 211#1 causes the CM 211#2 to execute revision processing, causes the CM 211#3 to executes revision processing after the revision processing of the CM 211#2 ends, and causes the CM 211#4 to execute revision processing after the revision processing of the CM 211#3 ends. After the revision processing of the CM 211#4 ends, the CM 211#1 switches the control CM to the CM 211#2. After the control CM is switched, the CM 211#2 causes the CM 211#1 to execute revision processing.

The second method is a method of performing revision processing with taken into account redundancy of the CMs 211. Redundancy is assured by the CMs 211#1 and 211#2, and redundancy is assured by the CMs 211#3 and 211#4. Redundancy of the CMs 211 is achieved by redundancy of path connection between the CA 304 in each CM 211 and the host I/O servers 202. For example, when revision processing is executed simultaneously by the CM 211#3 and the CM 211#4, the host I/O server 202 may not issue I/O. To avoid this, since the number of CMs that assure redundancy is two in this example, revision processing is performed separately at odd-numbered CMs 211 and even-numbered CMs 211. For example, the CM 211#1, which is an odd-numbered CM, causes the even-numbered CMs 211#2 and 211#4 to simultaneously execute revision processing. Then, after the revision processing of the CMs 211#2 and 211#4 ends, the CM 211#1 switches the control CM to the CM 211 at which the revision processing is completed, for example, the CM 211#2. After the control CM is switched, the CM 211#2 as the control CM causes the odd-numbered CMs 211#1 and 211#3 to execute revision processing.

The following describes a flowchart of a series of processing when a command is received with reference to FIGS. 7 to 11.

Figure 7:
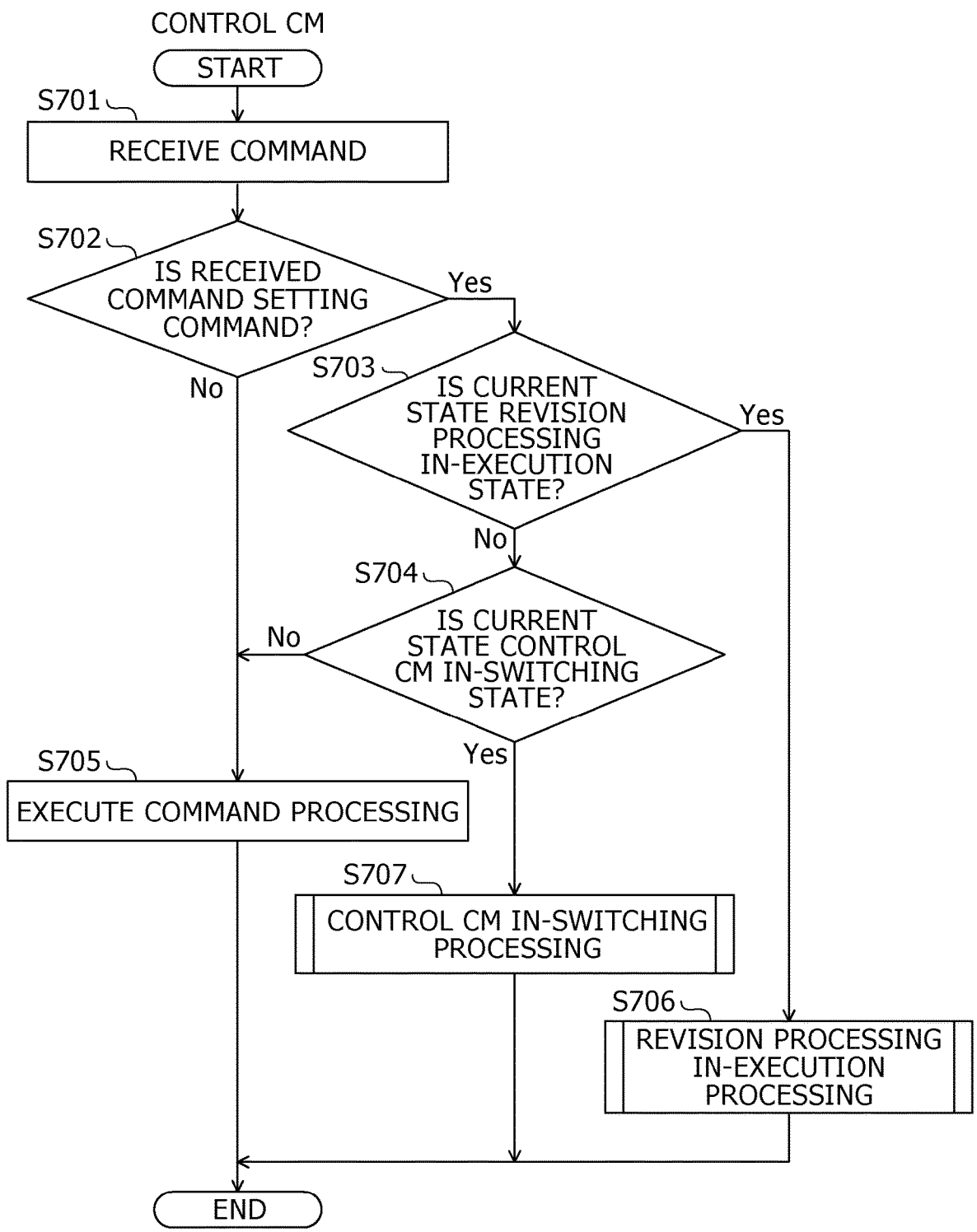
FIG. 7 is a flowchart illustrating an exemplary procedure of command reception processing.

FIG. 7 is a flowchart illustrating an exemplary procedure of command reception processing. The command reception processing is executed in a job in the control CM.

The control CM receives a command (step S701). Subsequently, the control CM determines whether the received command is a setting command (step S702). For example, the control CM may determine whether the received command is a setting command or a reference command based on a flag in the received command or may determine whether the received command is a setting command or a reference command by referring to a list including a command name.

When the received command is a setting command (Yes at step S702), the control CM determines whether the current state of the storage device 201 is the revision processing in-execution state (step S703). The current state of the storage device 201 is any of the revision processing unexecuted state, the revision processing in-execution state, and the control CM in-switching state illustrated in FIGS. 5 and 6. The control CM stores the current state of the storage device 201 as a variable. The initial value of the variable is the revision processing unexecuted state.

When the current state of the storage device 201 is not in the revision processing in-execution state (No at step S703), the control CM determines whether the current state of the storage device 201 is the control CM in-switching state (step S704).

When the received command is not a setting command, in other words, when the received command is a reference command (No at step S702), or when the current state is not in the control CM in-switching state (No at step S704), the control CM executes command processing of the received command (step S705). The state with No at step S704 is the current revision processing unexecuted state of the storage device 201.

When the current state is the revision processing in-execution state (Yes at step S703), the control CM executes revision processing in-execution processing (step S706). The revision processing in-execution processing will be described later with reference to FIG. 8. When the current state is the control CM in-switching state (Yes at step S704), the control CM executes control CM in-switching processing (step S707). After the processing at any of steps S705 to S707 ends, the control CM ends the command reception processing.

Figure 8:
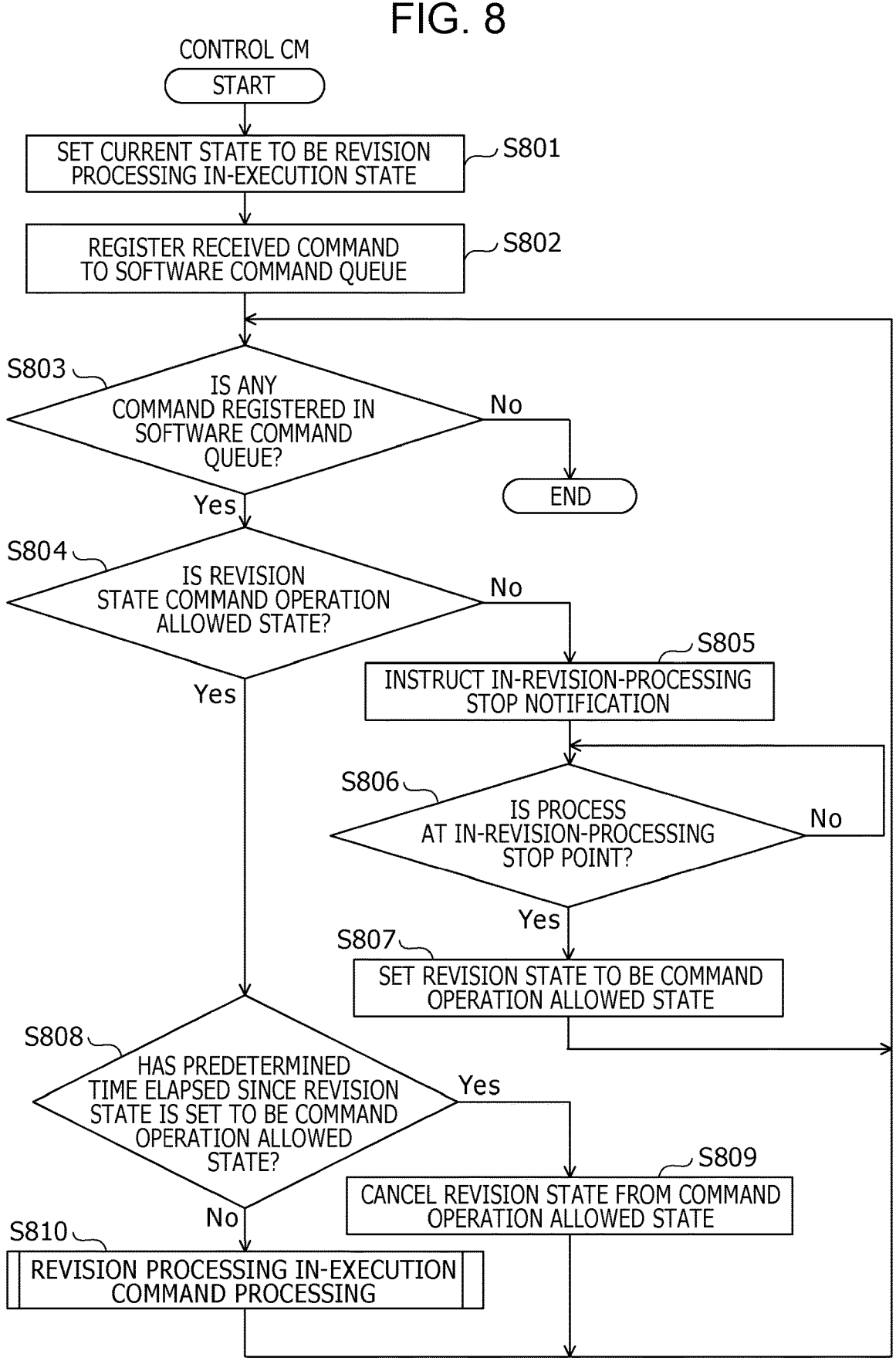
FIG. 8 is a flowchart illustrating an exemplary procedure of revision processing in-execution processing.

FIG. 8 is a flowchart illustrating an exemplary procedure of the revision processing in-execution processing. The control CM sets the current state of the storage device 201 to be the revision processing in-execution state (step S801). Subsequently, the control CM registers the received command to a software command queue (step S802). Then, the control CM determines whether any command is registered to the software command queue (step S803). When no command is registered to the software command queue (No at step S803), the control CM ends the revision processing in-execution processing.

When any command is registered to the software command queue (Yes at step S803), the control CM determines whether a revision state is a command operation allowed state (step S804). The initial value of the revision state is a value indicating a state that is not the command operation allowed state.

When the revision state is not the command operation allowed state (No at step S804), the control CM instructs a job that controls the revision processing to perform in-revision-processing stop notification (step S805). Then, the control CM determines whether the process is at an in-revision-processing stop point (step S806). When the process is not at the in-revision-processing stop point (No at step S806) the control CM repeats the processing at step S806. When the process is at the in-revision-processing stop point (Yes at step S806), the control CM sets the revision state to be the command operation allowed state (step S807) and transitions to the processing at step S803.

When the revision state is the command operation allowed state (Yes at step S804), the control CM determines whether a predetermined time has elapsed since the revision state is set to be the command operation allowed state (step S808).

When the predetermined time has elapsed since the revision state is set to be the command operation allowed state (Yes at step S808), the control CM cancels the revision state from the command operation allowed state (step S809) and transitions to the processing at step S803.

When the predetermined time has not elapsed since the revision state is set to be the command operation allowed state (No at step S808), the control CM executes revision processing in-execution command processing (step S810). The revision processing in-execution command processing will be described later with reference to FIG. 9. After the revision processing in-execution command processing ends, the control CM transitions to the processing at step S803.

Figure 9:
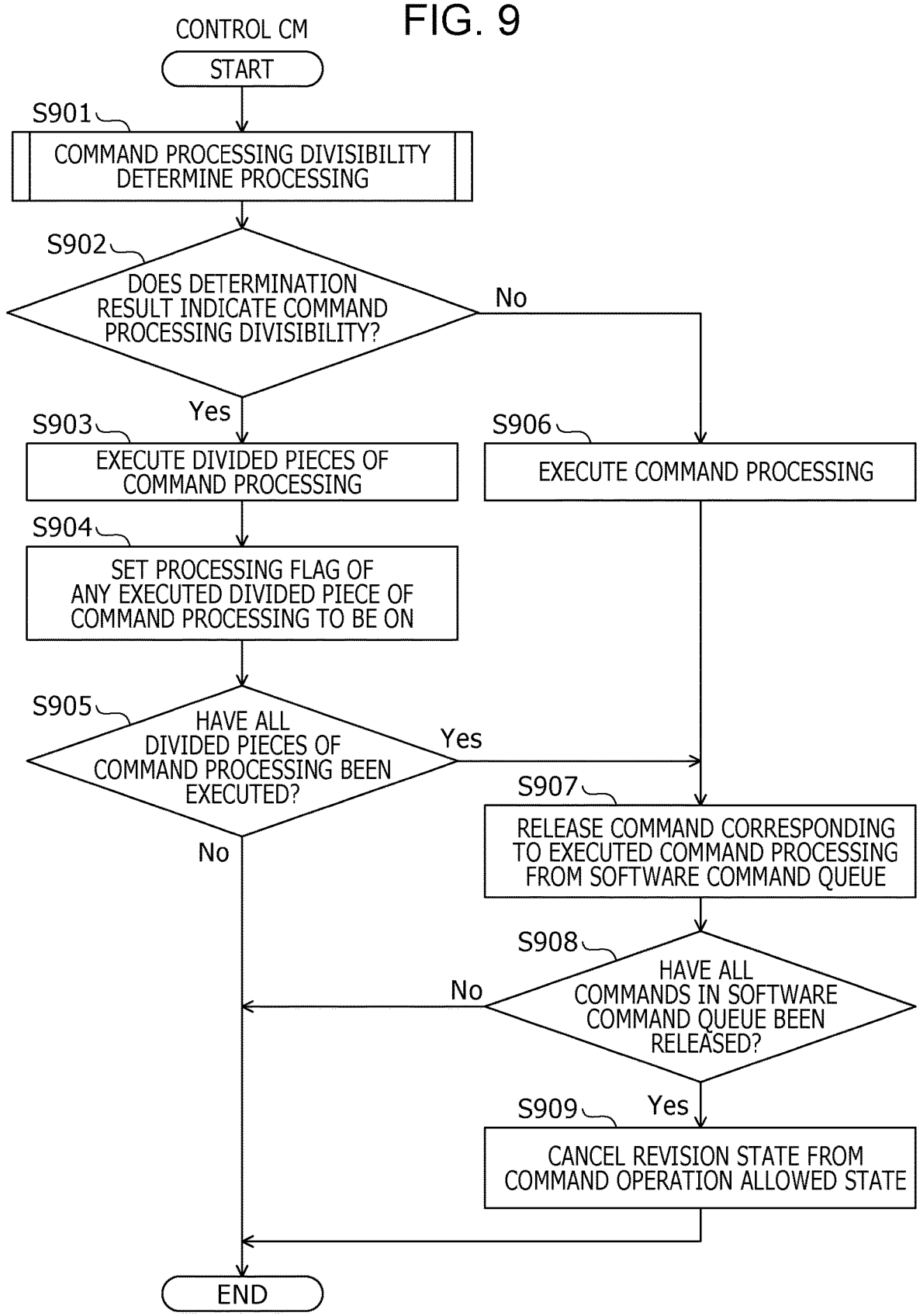
FIG. 9 is a flowchart illustrating an exemplary procedure of revision processing in-execution command processing.

FIG. 9 is a flowchart illustrating an exemplary procedure of the revision processing in-execution command processing. The control CM executes command processing divisibility determination processing (step S901). The command processing divisibility determination processing will be described later with reference to FIG. 10.

After the command processing divisibility determination processing ends, the control CM determines whether a determination result by the command processing divisibility determination processing indicates command processing divisibility (step S902). When the determination result indicates command processing divisibility (Yes at step S902), the control CM executes divided pieces of command processing (step S903). Then, the control CM sets, in the command processing division list 413, a processing flag of any executed divided piece of the command processing to be ON (step S904). Subsequently, the control CM determines whether all divided pieces of the command processing have been executed (step S905). When any divided piece of the command processing is yet to be executed (No at step S905), the control CM ends the revision processing in-execution command processing.

When the determination result by the command processing divisibility determination processing does not indicate command processing divisibility (No at step S902), the control CM executes the command processing (step S906). After the processing at step S906 ends or when all divided pieces of the command processing have been executed (Yes at step S905), the control CM releases a command corresponding to the executed command processing from the software command queue (step S907). Then, the control CM determines whether all commands in the software command queue have been released (step S908).

When all released commands in the software command queue have been released (Yes at step S908), the control CM cancels the revision state from the command operation allowed state (step S909) and ends the revision processing in-execution command processing. When not all commands in the software command queue have been released (No at step S908), the control CM ends the revision processing in-execution command processing.

Figure 10:
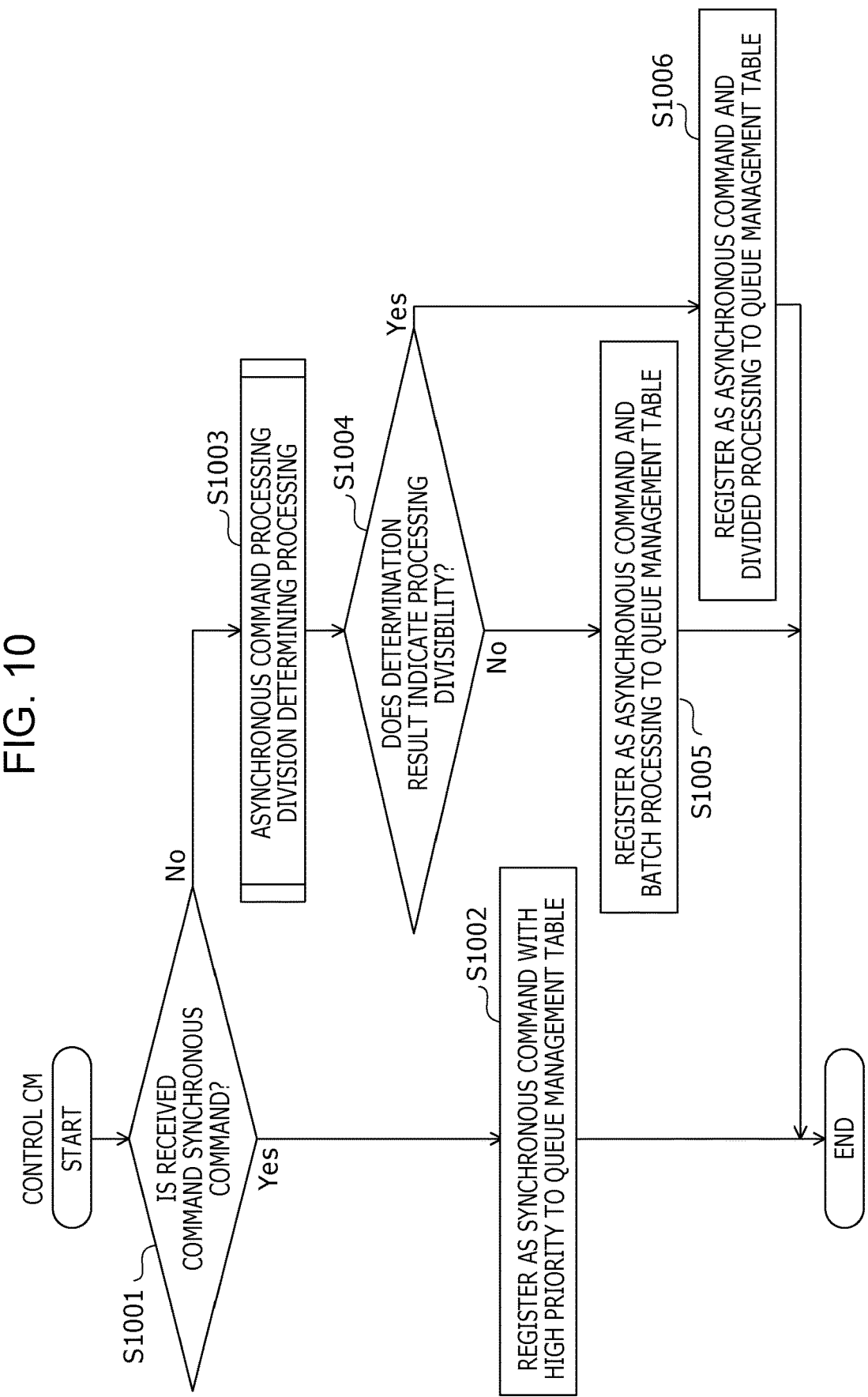
FIG. 10 is a flowchart illustrating an exemplary procedure of command processing divisibility determination processing.

FIG. 10 is a flowchart illustrating an exemplary procedure of the command processing divisibility determination processing. The control CM determines whether the received command is a synchronous command (step S1001). When the received command is a synchronous command (Yes at step S1001), the control CM registers the received command as a synchronous command with high priority to the queue management table 412 (step S1002).

When the received command is not a synchronous command (No at step S1001), the control CM executes asynchronous command processing division determination processing (step S1003). The asynchronous command processing division determination processing will be described later with reference to FIGS. 11 and 12. After the asynchronous command processing division determination processing ends, the control CM determines whether a determination result by the asynchronous command processing division determination processing indicates processing divisibility (step S1004). When the determination result by the asynchronous command processing division determination processing indicates batch processing (No at step S1004), the control CM registers the received command as an asynchronous command and batch processing to the queue management table 412 (step S1005).

When the determination result by the asynchronous command processing division determination processing indicates processing divisibility (Yes at step S1004), the control CM registers the received command as an asynchronous command and divided processing to the queue management table 412 (step S1006). After the processing at any of steps S1002, S1005, and S1006 ends, the control CM ends the command processing divisibility determination processing.

Figure 11:
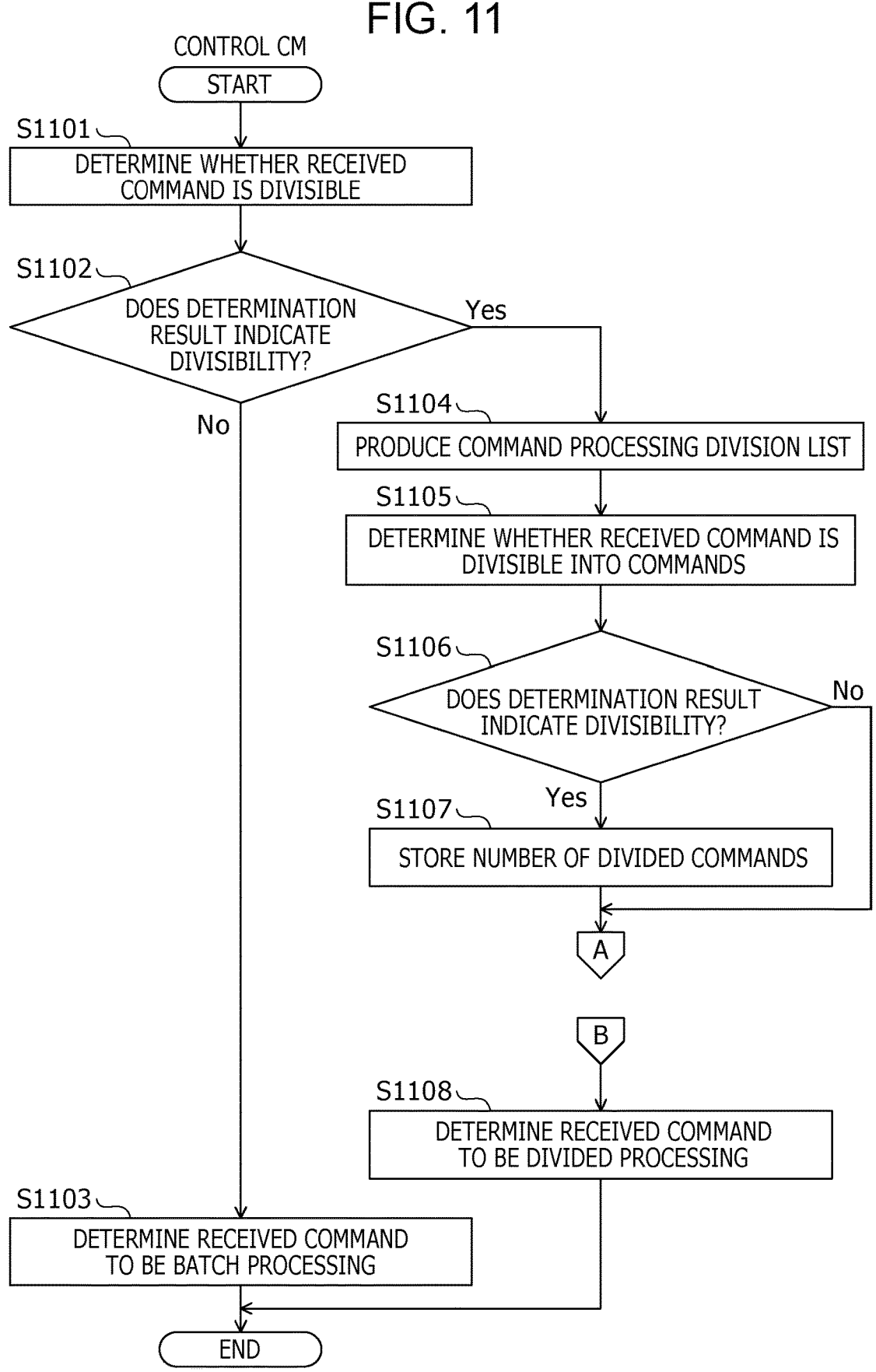
FIG. 11 is a flowchart (1) illustrating an exemplary procedure of asynchronous command processing division determination processing.
Figure 12:
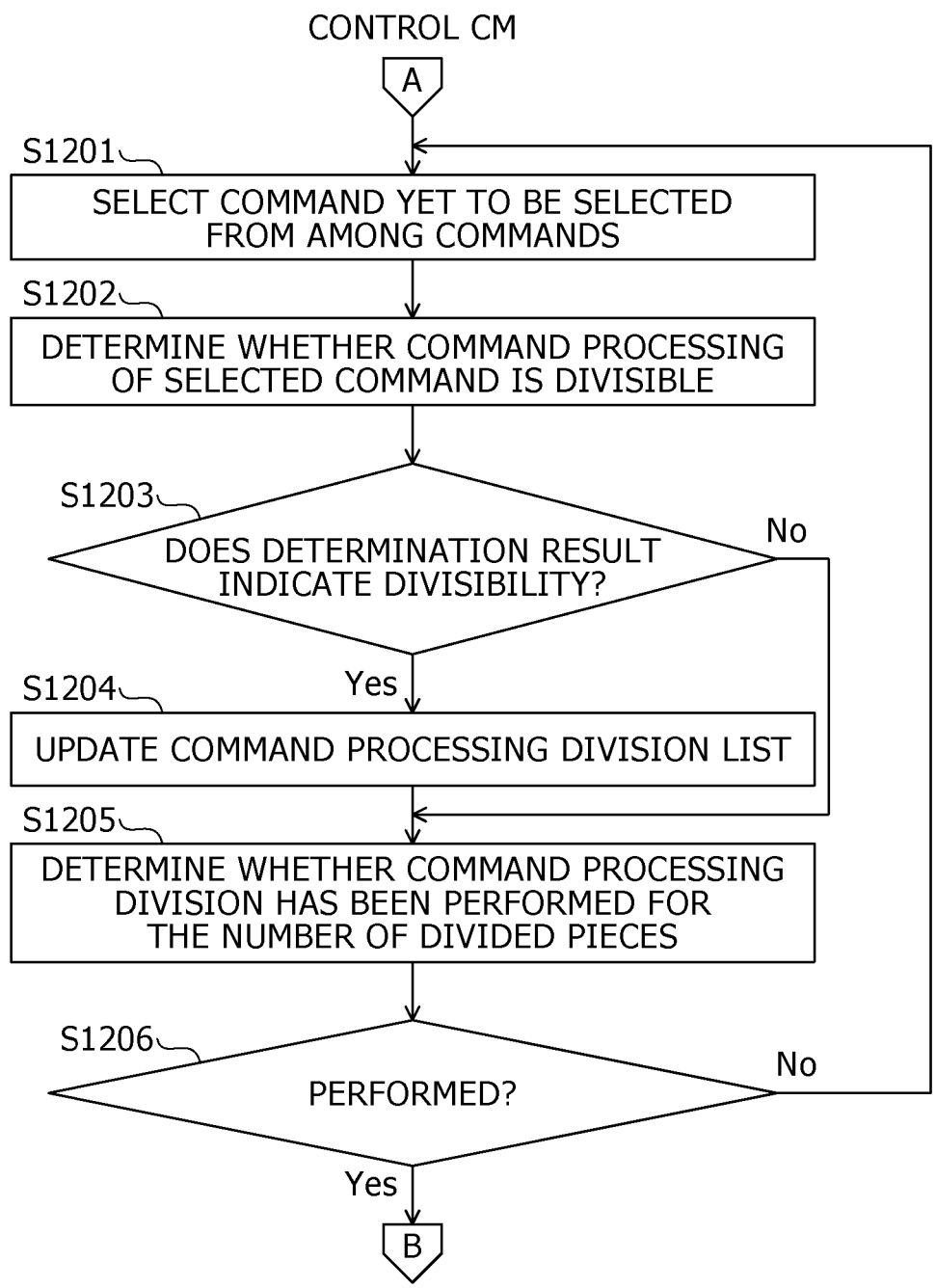
FIG. 12 is a flowchart (2) illustrating an exemplary procedure of asynchronous command processing division determination processing.

FIG. 11 is a flowchart (1) illustrating an exemplary procedure of the asynchronous command processing division determination processing. FIG. 12 is a flowchart (2) illustrating an exemplary procedure of the asynchronous command processing division determination processing.

The control CM determines whether the received command is divisible (step S1101). Subsequently, the control CM determines whether a result of the determination indicates divisibility (step S1102). When the determination result does not indicate divisibility (No at step S1102), the control CM determines the received command to be batch processing (step S1103) and ends the asynchronous command processing division determination processing.

When the determination result indicates divisibility (Yes at step S1102), the control CM produces the command processing division list 413 (step S1104). Subsequently, the control CM determines whether the received command is divisible into commands (step S1105). In the processing at step S1105, the received command is a command list to which a plurality of commands are written in some cases. When the received command is such a command list, the control CM determines that the received command is divisible into individual commands.

Then, the control CM determines whether a result of the determination indicates divisibility (step S1106). When the determination result indicates divisibility (Yes at step S1106), the control CM stores the number of divided pieces of the command (step S1107).

After the processing at step S1107 ends or when the determination result does not indicate divisibility (No at step S1106), the control CM selects any command yet to be selected from among the commands (step S1201). Subsequently, the control CM determines whether command processing of the selected command is divisible (step S1202). Then, the control CM determines whether a result of the determination indicates divisibility (step S1203). When the determination result indicates divisibility (Yes at step S1203), the control CM updates the command processing division list (step S1204).

After the processing at step S1204 ends or when the determination result does not indicate divisibility (No at step S1203), the control CM determines whether divided command processing has been performed for the number of divided pieces stored in the processing at step S1107 (step S1205). Then, the control CM determines whether a result of the determination indicates that the divided command processing has been performed for the number of divided pieces (step S1206). When the determination result does not indicate so (No at step S1206), the control CM transitions to the processing at step S1201. When the determination result indicates that the divided command processing has been performed for the number of divided pieces (Yes at step S1206), the control CM determines the received command to be divided processing (step S1108) and ends the asynchronous command processing division determination processing.

FIG. 13 is an explanatory diagram illustrating exemplary storage contents of the queue management table 412. The queue management table 412 illustrated in FIG. 13 includes records 1301-1 to 1301-4. Each record in the queue management table 412 stores information related to one command.

The queue management table 412 includes the fields of "No.", "synchronization", "division", "number of divided pieces", and "number of processed pieces". The "No." field indicates the order of a command. The "synchronization" field stores an identifier indicating whether a command is synchronous. Specifically, the "synchronization" field stores the identifier "On" when the command is synchronous, or stores the identifier "Off" when the command is asynchronous.

The "division" field stores a value indicating whether command processing is divisible when the command processing is asynchronous. Specifically, the "division" field stores the identifier "On" when the command processing is divisible, or stores the identifier "Off" when the command processing is indivisible.

The "number of divided pieces" field stores a value indicating the number of divided pieces of command processing when the command processing is divisible. The "number of processed pieces" field stores the number of processed pieces among divided pieces of command processing when the command processing is divisible.

FIG. 14 is an explanatory diagram illustrating exemplary storage contents of the command processing division list 413. The command processing division list 413 illustrated in FIG. 14 includes records 1401-1 to 1401-5. The command processing division list 413 stores information related to divided pieces obtained by dividing command processing. The records 1401-1 to 1401-5 illustrated in FIG. 14 correspond to divided pieces obtained by dividing command processing of a command corresponding to the record 1301-2 illustrated in FIG. 13.

The command processing division list 413 includes the fields of "No.", "processing No.", "processing flag", "processing command", and "processing data". The "No." field stores No. of a command from which divided pieces of command processing are obtained in the queue management table 412. The "processing No." field stores No. of a divided piece of command processing. The "processing flag" field stores an identifier indicating whether a divided piece of command processing has been performed. Specifically, the "processing flag" field stores the identifier "On" when the divided piece of the command processing has been performed, or stores the identifier "Off" when the divided piece of the command processing has not been performed.

The "processing command" field stores a specific string indicating a divided piece of command processing. The "processing data" field stores processing data as an argument of a divided piece of command processing.

Figure 15:
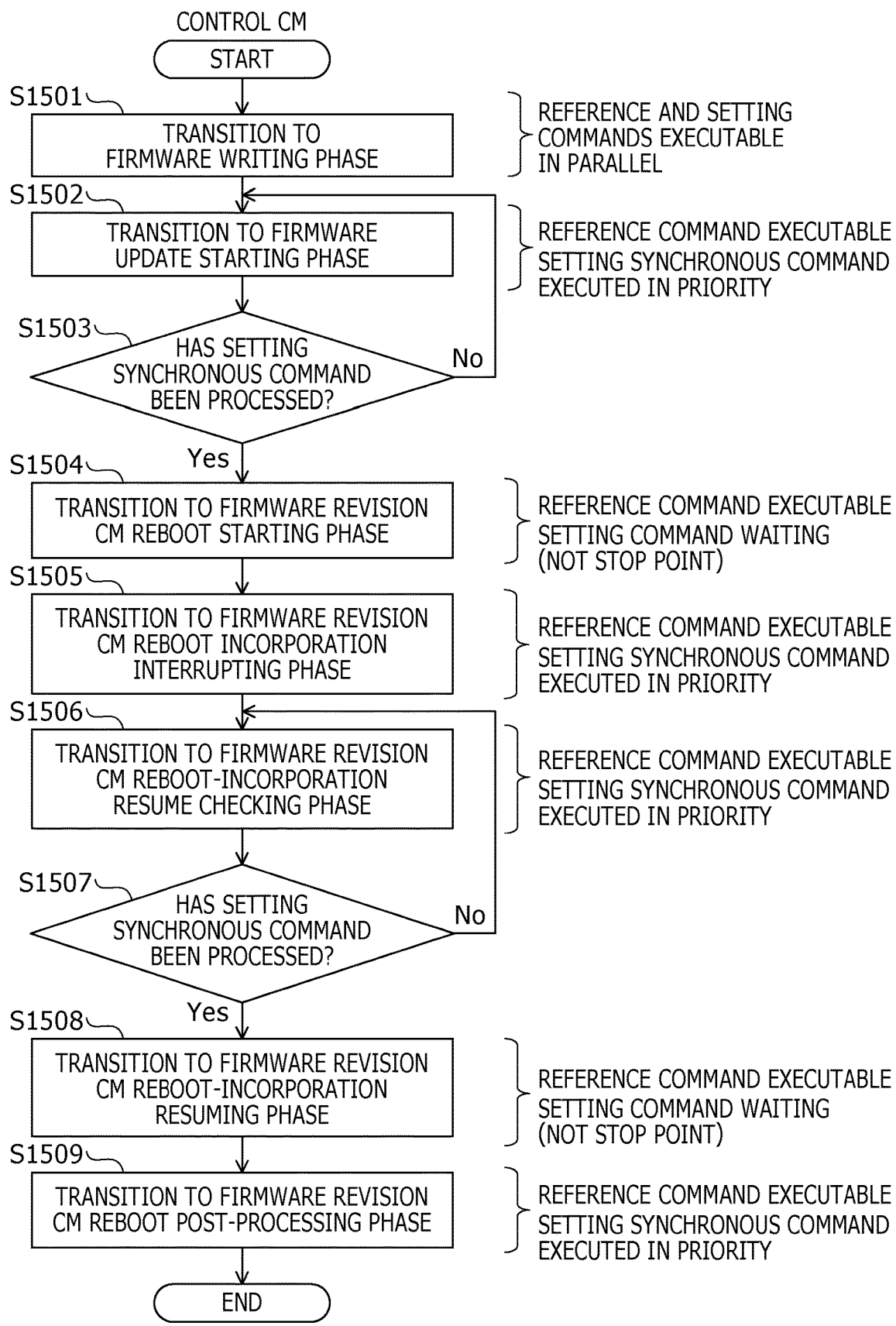
FIG. 15 is a flowchart illustrating an exemplary procedure of revision control processing.

FIG. 15 is a flowchart illustrating an exemplary procedure of revision control processing. The revision control processing is processing of querying the state of the revision target CM to the revision target CM and causing the revision target CM to execute a divided piece of the revision processing in accordance with a result of the query.

The control CM transitions to a firmware writing phase as the first phase of the revision processing (step S1501). In the firmware writing phase, reference and setting commands are executable in parallel by the control CM. In the firmware writing phase, the control CM instructs the revision target CM to execute processing of writing the firmware to the flash ROM 302 of the revision target CM.

When having received, from the revision target CM, notification that the writing to the flash ROM 302 of the revision target CM has ended, the control CM transitions to a firmware update starting phase as the second phase of the revision processing (step S1502). Firmware update at step S1502 includes CM reboot and incorporation at step S1504 or later. In the firmware update starting phase, a reference command is executable. As for a setting command, the control CM executes synchronous command in priority. After the synchronous command ends, the control CM executes asynchronous command processing in an amount executable in the remaining time of a predetermined time corresponding to the firmware update starting phase. More specifically, the predetermined time starts when transition is made to the firmware update starting phase. Thus, the control CM executes the synchronous command in priority at a time when transition is made to the firmware update starting phase. Then, after the synchronous command ends and when the predetermined time has not elapsed since the above-described time, the control CM executes asynchronous command processing in an amount executable in a remaining time obtained by subtracting, from the predetermined time, the difference between the current time and the above-described time.

Subsequently, the control CM determines whether a setting synchronous command has been processed (step S1503). When the setting synchronous command has not been processed (No at step S1503), the control CM transitions to the processing at step S1502.

When the setting synchronous command has been processed (Yes at step S1503) and the predetermined time corresponding to the firmware update starting phase has been elapsed, the control CM transitions to a firmware revision CM reboot starting phase as the third phase of the revision processing (step S1504). In the firmware revision CM reboot starting phase, a reference command is executable by the control CM. A state after the processing at step S1504 has been performed is not at the in-revision-processing stop point but at one place leading to No in the processing at step S806. Since No is obtained in the processing at step S806, the control CM does not transition to the processing at step S807 but becomes a waiting state in the processing illustrated in FIG. 8. The CM reboot is a process in which the revision target CM is rebooted and the firmware in the flash ROM 302 is loaded onto the memory 303. Thus, in the firmware revision CM reboot starting phase, the control CM instructs the revision target CM to reboot and load the firmware in the flash ROM 302 of the revision target onto the memory 303.

When having received, from the revision target CM, notification that the rebooting and the loading of the firmware in the flash ROM 302 of the revision target onto the memory 303 have ended, the control CM transitions to a firmware revision CM reboot-incorporation interrupting phase as the fourth phase of the revision processing (step S1505). In the firmware revision CM reboot-incorporation interrupting phase, a command may be received from the system operation software installation server 204. In the firmware revision CM reboot-incorporation interrupting phase, a reference command is executable by the control CM. As for a setting command, the control CM executes a synchronous command in priority. After the synchronous command ends, the control CM executes an executable amount of asynchronous command processing.

Then, the control CM transitions to a firmware revision CM reboot-incorporation resume checking phase as the fifth phase of the revision processing (step S1506). The incorporation is incorporation of the revision target CM into the storage device 201. The incorporation is performed because, at firmware revision, the revision target CM is temporarily separated from the storage device 201 and then incorporated into the storage device 201. In the firmware revision CM reboot-incorporation resume checking phase, a reference command is executable by the control CM. As for a setting command, the control CM executes a synchronous command in priority. After the synchronous command ends, the control CM executes asynchronous command processing in an amount executable in the remaining time of a predetermined time corresponding to the firmware revision CM reboot-incorporation resume checking phase. In the firmware revision CM reboot-incorporation resume checking phase, the control CM instructs the revision target CM to check whether the revision target CM may be incorporated.

Subsequently, the control CM determines whether a setting synchronous command has been processed (step S1507). When the setting synchronous command has not been processed (No at step S1507), the control CM transitions to the processing at step S1506.

When the setting synchronous command has been processed (Yes at step S1507) and the predetermined time corresponding to the firmware revision CM reboot-incorporation resume checking phase has been elapsed, the control CM transitions to a firmware revision CM reboot-incorporation resuming phase as the sixth phase of the revision processing (step S1508). In the firmware revision CM reboot-incorporation resuming phase, a reference command is executable by the control CM. A state after the processing at step S1508 has been performed is not at the in-revision-processing stop point but at one place leading to No in the processing at step S806. Since No is obtained in the processing at step S806, the control CM does not transition to the processing at step S807 but becomes a waiting state in the processing illustrated in FIG. 8. The control CM instructs the revision target CM to perform incorporation of the revision target CM.

When having received, from the revision target CM, notification that the incorporation of the revision target CM has ended, the control CM transitions to a firmware revision CM reboot post-processing phase as the seventh phase of the revision processing (step S1509). In the firmware revision CM reboot post-processing phase, a reference command is executable by the control CM. As for a setting command, the control CM executes a synchronous command in priority. The post-processing is, for example, processing of checking whether connection between the revision target CM and another device in the storage system 200 is normal and setting the state of the revision target CM to be a state in which the revision processing has ended. The control CM instructs the revision target CM to execute the post-processing.

When having received, from the revision target CM, notification that the post-processing has ended, the control CM ends the revision control processing.

As described above, in firmware revision processing of the revision target CM, the CM 211 as the control CM executes any divided piece obtained by dividing setting command processing while executing a divided piece of the revision processing executable in parallel with the setting command processing. Accordingly, the CM 211 may execute the setting command processing without delay of the revision processing. The division of the command processing leads to increase of the amount of processing during processing executable in parallel among the divided pieces of the revision processing, and thus the CM 211 may further reduce influence on delay of the revision processing as compared to a case in which the command processing is not divided.

The CM 211 as the control CM executes each divided piece of the command processing until a predetermined time corresponding to a phase executable in parallel with the setting command processing among the phases of the revision processing elapses since the revision target CM starts executing the processing of the phase. Accordingly, the CM 211 as the control CM may execute divided pieces of the command processing in an amount executable during any divided piece of the revision processing.

When having received a setting synchronous command, the CM 211 as the control CM does not divide command processing of the synchronous command but executes the command processing before any divided piece of the revision processing inexecutable parallel with setting command processing. Since a synchronous command has to be executed immediately, the CM 211 as the control CM promptly transmits a response to the synchronous command to the system operation software installation server 204 as the sender of the synchronous command.

Divided pieces of the revision processing executable in parallel with setting command processing may be the processing of writing the firmware to the flash ROM 302 of the second CM, the processing of determining whether the second CM 211 may be incorporated into the storage device 201, and the post-processing illustrated in FIG. 15. In this manner, the CM 211 as the control CM defines divided pieces of the revision processing executable in parallel with setting command processing in addition to the processing of writing the firmware to the flash ROM 302 of the second CM. Thus, the CM 211 as the control CM may perform a larger amount of processing in parallel than a case in which only the processing of writing the firmware to the flash ROM 302 of the second CM is defined as a divided piece of the revision processing executable in parallel, and may further reduce influence on delay of the revision processing.

When having received a setting asynchronous command, the CM 211 as the control CM may divide command processing of the synchronous command. Since an asynchronous command does not have to be executed immediately, the system operation software installation server 204 as the sender of the asynchronous command may execute any other processing. Thus, when the command processing is divided, the CM 211 may further reduce influence on delay of the revision processing as compared to a case in which the command processing is not divided, and the system operation software installation server 204 may execute any other processing.

The storage control method described in the present embodiment may be achieved by a computer such as a personal computer or a work station executing a computer program prepared in advance. This storage control program is recorded in a computer-readable recording medium such as a hard disk, a flexible disk, a compact disc-read only memory (CD-ROM), or a digital versatile disk (DVD), and is read from the recording medium and executed by a computer. The storage control program may be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage device including a plurality of storage control devices that control storages, each of the storage control devices including:
   a memory, and
   a processor coupled to the memory and configured to:
   store, in the memory, configuration information related to configurations of the storages and synchronized among the storage control devices;
   store, when having received a command to change the configuration information while one other storage control device among the plurality of storage control devices is executing update processing of updating a firmware, specification information specifying a plurality of divided pieces of command processing obtained by dividing processing of the received command into executable units in the memory; and
   execute each of the divided pieces of the command processing specified by the specification information while the other storage control device is executing any divided piece of the update processing, executable in parallel with the processing of the command, among a plurality of divided pieces of the update processing obtained by dividing the update processing.

2. The storage device according to claim 1, wherein the processor is further configured to:
   store, in the memory, a predetermined time taken for each of the divided pieces of the update processing;
   execute each divided piece of the command processing specified by the specification information until the predetermined time taken for any of the divided pieces of the update processing elapses since the other storage control device starts executing the divided piece of the update processing executable in parallel with the processing of the command among the divided pieces of the update processing; and
   execute, when the divided pieces of the command processing include any unexecuted divided piece of the command processing, the unexecuted divided piece among the divided pieces of the command processing until a predetermined time, taken for a next divided piece of the update processing executable in parallel with the processing of the command, elapses since the other storage control device starts executing the next divided piece of the update processing.

3. The storage device according to claim 1, wherein the processor is further configured to:
   store, in the memory, when having received a synchronous command while the other storage control device is executing the update processing, the specification information specifying the processing of the synchronous command, wherein the synchronous command is for changing the configuration information, and for a sender of the synchronous command not to execute any other processing different from a reception processing for receiving a response to the synchronous command; and
   execute the processing of the synchronous command before the other storage control device executes any divided piece of the update processing, executable in parallel with the processing of the command, among the plurality of divided pieces of the update processing.

4. The storage device according to claim 1, wherein the divided piece of the update processing, executable in parallel with the processing of the command, among the plurality of divided pieces of the update processing is any of:
   a processing of writing the firmware into a non-volatile storage area of the other storage control device,
   a processing of determining whether the other storage control device is capable to be incorporated into the storage device, and
   a processing of checking whether the other storage control device is connected with another storage control device in the storage device after the other storage control device is incorporated into the storage device.

5. The storage device according to claim 1, wherein the processor is further configured to:
   divide the received command into executable units, in case the received command is an asynchronous command that allows a sender of the received command to execute any processing other than a processing of receiving a response to the command while completing the processing of receiving.

6. A storage control device in a storage device including a plurality of storage control devices for controlling storages, the storage control device including:
   a memory storing configuration information related to configurations of the storages and synchronized among the storage control devices; and
   a processor coupled to the memory and configured to:
   store, in the memory, when having received a command to change the configuration information while one other storage control device among the plurality of storage control devices is executing update processing of updating a firmware, specification information specifying a plurality of divided pieces of command processing obtained by dividing processing of the received command into executable units in the memory; and
   execute each of the divided pieces of the command processing specified by the specification information while the other storage control device is executing any divided piece of the update processing, executable in parallel with the processing of the command, among a plurality of divided pieces of the update processing obtained by dividing the update processing.

7. The storage control device according to claim 6, the processor further configured to:
   store, in the memory, a predetermined time taken for each of the divided pieces of the update processing;
   execute each divided piece of the command processing specified by the specification information until the predetermined time taken for any of the divided pieces of the update processing elapses since the other storage control device starts executing the divided piece of the update processing executable in parallel with the processing of the command among the divided pieces of the update processing; and
   execute, when the divided pieces of the command processing include any unexecuted divided piece of the command processing, the unexecuted divided piece among the divided pieces of the command processing until a predetermined time, taken for a next divided piece of the update processing executable in parallel with the processing of the command, elapses since the other storage control device starts executing the next divided piece of the update processing.

8. A non-transitory computer-readable storage medium storing a storage control program for one storage control device in a storage device that includes a plurality of storage control devices that control storages and in which configuration information related to configurations of the storages is synchronized among the storage control devices, the storage control program being configured to cause the one storage control device to execute a process including:

storing, in a memory, when having received a command to change the configuration information while any other storage control device among the plurality of storage control devices is executing update processing of updating a firmware, specification information specifying a plurality of divided pieces of command processing obtained by dividing processing of the received command into executable units in the memory; and executing each of the divided pieces of the command processing specified by the specification information while the other storage control device is executing any divided piece of the update processing, executable in parallel with the processing of the command, among a plurality of divided pieces of the update processing obtained by dividing the update processing.

9. The storage medium according to claim 8, the process further including:

storing, in the memory, a predetermined time taken for each of the divided pieces of the update processing;

executing each divided piece of the command processing specified by the specification information until the predetermined time taken for any of the divided pieces of the update processing elapses since the other storage control device starts executing the divided piece of the update processing executable in parallel with the processing of the command among the divided pieces of the update processing; and executing, when the divided pieces of the command processing include any unexecuted divided piece of the command processing, the unexecuted divided piece among the divided pieces of the command processing until a predetermined time, taken for a next divided piece of the update processing executable in parallel with the processing of the command, elapses since the other storage control device starts executing the next divided piece of the update processing.

* * * * *